(12) United States Patent
Zhao et al.

(10) Patent No.: US 11,202,323 B2
(45) Date of Patent: Dec. 14, 2021

(54) DATA TRANSMISSION METHOD AND APPARATUS TO REDUCE A DATA TRANSMISSION DELAY

(71) Applicant: HUAWEI TECHNOLOGIES CO., LTD., Guangdong (CN)

(72) Inventors: Yue Zhao, Beijing (CN); Fang Nan, Shenzhen (CN); Zheng Yu, Beijing (CN); Xingqing Cheng, Beijing (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 3 days.

(21) Appl. No.: 16/773,613

(22) Filed: Jan. 27, 2020

(65) Prior Publication Data

US 2020/0196355 A1 Jun. 18, 2020

Related U.S. Application Data

(63) Continuation of application No. PCT/CN2017/095072, filed on Jul. 28, 2017.

(51) Int. Cl.
*H04W 4/00* (2018.01)
*H04W 74/08* (2009.01)
(Continued)

(52) U.S. Cl.
CPC ... *H04W 74/0833* (2013.01); *H04W 72/1268* (2013.01); *H04W 80/02* (2013.01)

(58) Field of Classification Search
None
See application file for complete search history.

(56) References Cited

U.S. PATENT DOCUMENTS

2010/0331030 A1* 12/2010 Nory ............... H04L 5/0053
455/509
2012/0113848 A1* 5/2012 Kim ............... H04W 72/0413
370/252
(Continued)

FOREIGN PATENT DOCUMENTS

CN 102158981 A 8/2011
CN 102970761 A 3/2013
(Continued)

OTHER PUBLICATIONS

3GPP TS 36.321 V14.3.0 (Jun. 2017), 3rd Generation Partnership Project; Technical Specification Group Radio Access Network; Evolved Universal Terrestrial Radio Access (E-UTRA); Medium Access Control (MAC) protocol specification (Release 14), 107 pages.
(Continued)

*Primary Examiner* — Elisabeth Benoit Magloire
(74) *Attorney, Agent, or Firm* — Womble Bond Dickinson (US) LLP

(57) ABSTRACT

An embodiment of this application provides a data transmission method and apparatus. The method includes: receiving, by a base station, a random access preamble sequence from a terminal; and sending, by the base station, a media access control (MAC) packet data unit (PDU) to the terminal based on the random access preamble sequence, where the MAC PDU includes a type indication field, and the type indication field indicates a manner in which the terminal transmits data in first uplink information. In this embodiment of this application, a data transmission delay can be reduced.

8 Claims, 6 Drawing Sheets

(51) Int. Cl.
*H04W 72/12* (2009.01)
*H04W 80/02* (2009.01)

(56) References Cited

U.S. PATENT DOCUMENTS

| | | | |
|---|---|---|---|
| 2012/0207112 A1* | 8/2012 | Kim | H04W 52/54 370/329 |
| 2012/0314652 A1* | 12/2012 | Ahn | H04W 56/0045 370/328 |
| 2013/0003788 A1* | 1/2013 | Marinier | H04B 7/024 375/219 |
| 2013/0322376 A1* | 12/2013 | Marinier | H04B 7/0617 370/329 |
| 2015/0009985 A1* | 1/2015 | Kwon | H04W 56/0005 370/350 |
| 2017/0280483 A1* | 9/2017 | Liu | H04L 1/08 |

FOREIGN PATENT DOCUMENTS

| | | |
|---|---|---|
| CN | 103081379 A | 5/2013 |
| CN | 106961746 A | 7/2017 |
| EP | 3611947 A1 | 2/2020 |
| JP | 2019506795 A | 3/2019 |
| KR | 20140015100 A | 2/2014 |
| WO | 2016144082 A1 | 9/2016 |
| WO | 2017121212 A1 | 7/2017 |
| WO | 2018185654 A1 | 10/2018 |
| WO | 2018212699 A1 | 11/2018 |

OTHER PUBLICATIONS

3GPP TS 36. 321, V14.3.0,: 3rd Generation Partnership Project; Technical Specification Group Radio Access Network; Evolved Universal Terrestrial Radio Access (E-UTRA); Medium Access Control (MAC) protocol specification (Release 14) ,Jun. 23, 2017 (Jun. 23, 2017) pp. 1-107, XP051299019.

* cited by examiner

DATA TRANSMISSION METHOD AND APPARATUS TO REDUCE A DATA TRANSMISSION DELAY

CROSS-REFERENCE TO RELATED APPLICATIONS

This application is a continuation of International Application No. PCT/CN2017/095072, filed on Jul. 28, 2017, the disclosure of which is hereby incorporated by reference in its entirety.

TECHNICAL FIELD

This application relates to the field of information processing technologies, and in particular, to a data transmission method and apparatus.

BACKGROUND

Currently, because an increasing quantity of low-delay services are applied to a wireless communications system, a higher requirement is posed on a transmission delay of the wireless communications system, so that a transmission delay of service data in the wireless communications system can be further reduced.

A random access procedure includes the following operations: 1. A terminal selects a random access preamble and a physical random access channel (PRACH) resource, and sends the selected random access preamble to a base station by using the PRACH resource. 2. The base station receives the preamble, calculates a timing advance (TA), and sends a random access response to the terminal. The random access response includes at least the timing advance and uplink scheduling (UL grant). 3. The terminal sends an uplink message 3 (Msg3) on a specified UL grant. 4. UE determines, based on a message 4 (Msg4), whether random access succeeds, and if the random access succeeds, the terminal transmits data to the base station.

Therefore, in the foregoing data communication process, how to reduce a data transmission delay is a technical problem that is urgently to be resolved currently.

SUMMARY

Embodiments of this application provide a data transmission method and apparatus, so as to reduce a data transmission delay in a data communication process.

According to a first aspect, this application provides a data transmission method, including:

receiving, by a base station, a random access preamble sequence sent by a terminal; and sending, by the base station, a media access control MAC packet data unit (PDU) to the terminal based on the random access preamble sequence, where the MAC PDU includes a type indication field, and the type indication field is used to indicate a manner in which the terminal transmits data in first uplink information.

In the foregoing solution, in a random access procedure, the terminal needs to send the random access preamble sequence to the base station, and the base station returns a random access response (RAR) to the terminal based on the received random access preamble sequence. If the base station receives, within a same time, a plurality of random access preamble sequences sent by the terminal, the base station returns the MAC PDU to the terminal, so as to simultaneously respond to the plurality of random access preamble sequences sent by the terminal, where a response to each random access preamble sequence corresponds to one MAC RAR in the MAC PDU. The MAC PDU carries a type indication field, so as to indicate the manner in which the terminal transmits data in the first uplink information.

In this solution, the type indication field is used to indicate the manner in which the terminal transmits data in the first uplink information in a random access procedure, or may be used to indicate a transport block with a larger size than an existing transport block, or a granularity of resource allocation is smaller than that in the prior art, so that resource allocation is more flexible, and a delay of user data sent in the random access procedure is reduced, a data block is larger, and resource allocation is more flexible.

In one embodiment, the type indication field is located in a MAC random access response RAR of the MAC PDU.

In one embodiment, the type indication field is located in a MAC header of the MAC PDU.

In one embodiment, the type indication field includes one bit, and the one bit included in the type indication field is a first bit in the MAC RAR; or the one bit included in the type indication field is at least one of a $1^{st}$, $28^{th}$, $29^{th}$, $30^{th}$, $31^{st}$, or $32^{nd}$ bit in the MAC RAR.

In the foregoing solution, the MAC RAR includes a reserved bit, and the reserved bit in the MAC RAR is used as the type indication field, so as to indicate the manner in which the terminal transmits data in the first uplink information. In this way, when MAC PDU overheads are not added, a purpose of indicating the terminal is achieved, thereby reducing signaling overheads of a network.

In one embodiment, one MAC RAR in the MAC PDU corresponds to one sub-header in the MAC header of the MAC PDU, the sub-header includes eight bits, the sub-header is the $m^{th}$ sub-header in the MAC header, and m is a positive integer greater than or equal to 2; and the first bit in the sub-header is an extended field, the second bit in the sub-header is the type indication field, and the third bit to the eighth bit in the sub-header are used to indicate a random access preamble identifier.

In one embodiment, the MAC header of the MAC PDU includes L first sub-headers, each first sub-header includes n type indication fields, and each type indication field corresponds to one MAC RAR in the MAC PDU, where n is a positive integer, and L is a positive integer greater than or equal to 1.

In one embodiment, the L first sub-headers are the last L sub-headers in the MAC header, and the L first sub-headers do not include the first sub-header in the MAC header; or the L first sub-headers are the first L sub-headers in the MAC header other than the first sub-header.

In one embodiment, each first sub-header includes eight bits, and the first bit in each first sub-header is an extended field, the second bit is a type field, and the type field is used to indicate that the third bit to the eighth bit in the first sub-header is configured as the type indication field.

If the type field of the sub-header is set to 0, each of the third bit to the eighth bit in the sub-header corresponds to one type indication field.

In one embodiment, the $x^{th}$ type indication field in the first sub-header corresponds to the $x^{th}$ MAC RAR in the MAC PDU, where x is a positive integer.

In the foregoing solution, the manner in which the terminal transmits data in the first uplink information is indicated by using a field of the first sub-header in the MAC header, so that the manner in which the terminal is indicated is simpler.

In one embodiment, when the type indication field is 1, the type indication field indicates that the terminal transmits the data in the first uplink information in a first manner, and the first manner is a first uplink grant; or when the type indication field is 0, the type indication field indicates that the terminal transmits the data in the first uplink information in a second manner, and the second manner is the second uplink grant, and a quantity of bits included in the first uplink grant is the same as a quantity of bits included in the second uplink grant; or when the type indication field is 1, the type indication field indicates that the terminal transmits the data in the first uplink information in a third manner, and the third manner is a third uplink grant; or when the type indication field is 0, the type indication field indicates that the terminal transmits the data in the first uplink information in a fourth manner, and the fourth manner is the fourth uplink grant, and a quantity of bits included in the third uplink grant is the same as a quantity of bits included in the fourth uplink grant; or when the type indication field is 1, the type indication field indicates that the terminal transmits the data in the first uplink information in a fifth manner, and the fifth manner is a second uplink grant; or when the type indication field is 0, the type indication field indicates that the terminal transmits the data in the first uplink information in a sixth manner, and the sixth manner is the fourth uplink grant, and a quantity of bits included in the second uplink grant is the same as a quantity of bits included in the fourth uplink grant, where the first uplink grant indicates that the terminal determines, in a first query manner, a transport block size for transmitting the first uplink information; the second uplink grant indicates that the terminal determines, in a second query manner, the transport block size for transmitting the first uplink information; the third uplink grant indicates that the terminal allocates a resource in a unit of a physical resource block, and the resource allocated by using the third uplink grant is greater than or equal to one physical resource block; a resource allocated by using the fourth uplink grant is less than one physical resource block; and a maximum transport block size TBS determined in the first query manner is less than a maximum TBS determined in the second query manner.

In one embodiment, when the type indication field is 0, the type indication field indicates that the terminal transmits the data in the first uplink information in a seventh manner, and the seventh manner is the first uplink grant; or when the type indication field is 1, the type indication field indicates that the terminal transmits the data in the first uplink information in an eighth manner, and the eighth manner is the second uplink grant, and a quantity of bits included in the first uplink grant is the same as a quantity of bits included in the second uplink grant; or when the type indication field is 0, the type indication field indicates that the terminal transmits the data in the first uplink information in a ninth manner, and the ninth manner is a third uplink grant; or when the type indication field is 1, the type indication field indicates that the terminal transmits the data in the first uplink information in a tenth manner, and the tenth manner is the fourth uplink grant, and a quantity of bits included in the third uplink grant is the same as a quantity of bits included in the fourth uplink grant; or when the type indication field is 0, the type indication field indicates that the terminal transmits the data in the first uplink information in an eleventh manner, and the eleventh manner is a second uplink grant; or when the type indication field is 1, the type indication field indicates that the terminal transmits the data in the first uplink information in a twelfth manner, and the twelfth manner is the fourth uplink grant, and a quantity of bits included in the second uplink grant is the same as a quantity of bits included in the fourth uplink grant, where the first uplink grant indicates that the terminal determines, in a first query manner, a transport block size for transmitting the first uplink information; the second uplink grant indicates that the terminal determines, in a second query manner, the transport block size for transmitting the first uplink information; the third uplink grant indicates that the terminal allocates a resource in a unit of a physical resource block, and the resource allocated by using the third uplink grant is greater than or equal to one physical resource block; and the resource allocated by using the fourth uplink grant is less than one physical resource block; and a maximum transport block size TBS determined in the first query manner is less than a maximum TBS determined in the second query manner.

In one embodiment, when a physical random access channel of the terminal uses a first mode, the terminal transmits the data in the first uplink information in a thirteenth manner or a fourteenth manner, where the thirteenth manner is the first uplink grant, and the fourteenth manner is the second uplink grant; and/or when a physical random access channel of the terminal uses a second mode, the terminal transmits the data in the first uplink information in a fifteenth manner or a sixteenth manner, where the fifteenth manner is the third uplink grant, and the sixteenth manner is the fourth uplink grant, where the first mode is one or more of a coverage enhancement level 0, a coverage enhancement level 1, and a coverage enhancement mode A, and the second mode is one or more of a coverage enhancement level 2, a coverage enhancement level 3, and a coverage enhancement mode B.

In one embodiment, the first uplink information is uplink information associated with the MAC RAR in the MAC PDU; or the first uplink information is carried on a physical uplink shared channel, and the first uplink information is the first piece of uplink information after the MAC RAR; or the first uplink information is a message 3 in a random access procedure; or the first uplink information is uplink information between a message 3 in a random access procedure and a contention resolution message in a random access procedure; or the first uplink information is uplink information between a random access response message and a contention resolution message in a random access procedure.

According to a second aspect, this application provides a data transmission method, including:

sending, by a terminal, a random access preamble sequence to a base station; and receiving, by the terminal, a media access control MAC packet data unit PDU sent by the base station based on the random access preamble sequence; where the MAC PDU includes a type indication field, and the type indication field is used to indicate a manner in which the terminal transmits data in first uplink information.

In the foregoing solution, in a random access procedure, the terminal needs to send the random access preamble sequence to the base station, and the base station returns a random access response (Random Access Response, RAR) to the terminal based on the received random access preamble sequence. If the base station receives, within a same time, a plurality of random access preamble sequences sent by the terminal, the base station returns the MAC PDU to the terminal, so as to simultaneously respond to the plurality of random access preamble sequences sent by the terminal, where a response to each random access preamble sequence corresponds to one MAC RAR in the MAC PDU. The MAC PDU carries a type indication field, so as to indicate the manner in which the terminal transmits data in the first uplink information.

In this solution, the type indication field is used to indicate the manner in which the terminal transmits data in the first uplink information in a random access procedure, or may be used to indicate a transport block with a larger size than an existing transport block, or a granularity of resource allocation is smaller than that in the prior art, so that resource allocation is more flexible, and a delay of user data sent in the random access procedure is reduced, a data block is larger, and resource allocation is more flexible.

In one embodiment, the type indication field is located in a MAC random access response RAR of the MAC PDU.

In one embodiment, the type indication field is located in a MAC header of the MAC PDU.

In one embodiment, the type indication field includes one bit, and the bit included in the type indication field is the first bit in the MAC RAR; or the bit included in the type indication field is at least one of the $1^{st}$, $28^{th}$, $29^{th}$, $30^{th}$, $31^{st}$, or $32^{nd}$ bit in the MAC RAR.

In the foregoing solution, the MAC RAR includes a reserved bit, and the reserved bit in the MAC RAR may be used as the type indication field, so as to indicate the manner in which the terminal transmits data in the first uplink information. In this way, when MAC PDU overheads are not added, a purpose of indicating the terminal is achieved, thereby reducing signaling overheads of a network.

In one embodiment, one MAC RAR in the MAC PDU corresponds to one sub-header in the MAC header of the MAC PDU, the sub-header includes eight bits, the sub-header is the $m^{th}$ sub-header in the MAC header, and m is a positive integer greater than or equal to 2; and the first bit in the sub-header is an extended field, the second bit in the sub-header is the type indication field, and the third bit to the eighth bit in the sub-header are used to indicate a random access preamble identifier.

In one embodiment, the MAC header of the MAC PDU includes L first sub-headers, each first sub-header includes n type indication fields, and each type indication field corresponds to one MAC RAR in the MAC PDU, where n is a positive integer, and L is a positive integer greater than or equal to 1.

In one embodiment, the L first sub-headers are the last L sub-headers in the MAC header, and the L first sub-headers do not include the first sub-header in the MAC header; or the L first sub-headers are the first L sub-headers in the MAC header other than the first sub-header.

In one embodiment, each first sub-header includes eight bits, and the first bit in each first sub-header is an extended field, the second bit is a type field, and the type field is used to indicate that the third bit to the eighth bit in the first sub-header is configured as the type indication field.

If the type field of the sub-header is set to 0, each of the third bit to the eighth bit in the sub-header corresponds to one type indication field.

In one embodiment, the $x^{th}$ type indication field in the first sub-header corresponds to the $x^{th}$ MAC RAR in the MAC PDU, where x is a positive integer.

In the foregoing solution, the manner in which the terminal transmits data in the first uplink information is indicated by using a field of the first sub-header in the MAC header, so that the manner in which the terminal is indicated is simpler.

In one embodiment, when the type indication field is 1, the type indication field indicates that the terminal transmits the data in the first uplink information in a first manner, and the first manner is a first uplink grant; or when the type indication field is 0, the type indication field indicates that the terminal transmits the data in the first uplink information in a second manner, and the second manner is the second uplink grant, and a quantity of bits included in the first uplink grant is the same as a quantity of bits included in the second uplink grant; or when the type indication field is 1, the type indication field indicates that the terminal transmits the data in the first uplink information in a third manner, and the third manner is a third uplink grant; or when the type indication field is 0, the type indication field indicates that the terminal transmits the data in the first uplink information in a fourth manner, and the fourth manner is the fourth uplink grant, and a quantity of bits included in the third uplink grant is the same as a quantity of bits included in the fourth uplink grant; or when the type indication field is 1, the type indication field indicates that the terminal transmits the data in the first uplink information in a fifth manner, and the fifth manner is a second uplink grant; or when the type indication field is 0, the type indication field indicates that the terminal transmits the data in the first uplink information in a sixth manner, and the sixth manner is the fourth uplink grant, and a quantity of bits included in the second uplink grant is the same as a quantity of bits included in the fourth uplink grant, where the first uplink grant indicates that the terminal determines, in a first query manner, a transport block size for transmitting the first uplink information; the second uplink grant indicates that the terminal determines, in a second query manner, the transport block size for transmitting the first uplink information; the third uplink grant indicates that the terminal allocates a resource in a unit of a physical resource block, and the resource allocated by using the third uplink grant is greater than or equal to one physical resource block; and the resource allocated by using the fourth uplink grant is less than one physical resource block; and a maximum transport block size TBS determined in the first query manner is less than a maximum TBS determined in the second query manner.

In one embodiment, when the type indication field is 0, the type indication field indicates that the terminal transmits the data in the first uplink information in a seventh manner, and the seventh manner is the first uplink grant; or when the type indication field is 1, the type indication field indicates that the terminal transmits the data in the first uplink information in an eighth manner, and the eighth manner is the second uplink grant, and a quantity of bits included in the first uplink grant is the same as a quantity of bits included in the second uplink grant; or when the type indication field is 0, the type indication field indicates that the terminal transmits the data in the first uplink information in a ninth manner, and the ninth manner is a third uplink grant; or when the type indication field is 1, the type indication field indicates that the terminal transmits the data in the first uplink information in a tenth manner, and the tenth manner is the fourth uplink grant, and a quantity of bits included in the third uplink grant is the same as a quantity of bits included in the fourth uplink grant; or when the type indication field is 0, the type indication field indicates that the terminal transmits the data in the first uplink information in an eleventh manner, and the eleventh manner is a second uplink grant; or when the type indication field is 1, the type indication field indicates that the terminal transmits the data in the first uplink information in a twelfth manner, and the twelfth manner is the fourth uplink grant, and a quantity of bits included in the second uplink grant is the same as a quantity of bits included in the fourth uplink grant, where the first uplink grant indicates that the terminal determines, in a first query manner, a transport block size for transmitting the first uplink information; the second uplink grant indicates that the terminal determines, in a second query manner, the transport block size for transmitting the first uplink information; the third uplink grant indicates that the terminal allocates a resource in a unit of a physical resource block, and the resource allocated by using the third uplink grant is greater than or equal to one physical resource block; and the resource allocated by using the fourth uplink grant is less than one physical resource block; and a maximum transport block size TBS determined in the first query manner is less than a maximum TBS determined in the second query manner.

In one embodiment, when a physical random access channel of the terminal uses a first mode, the terminal transmits the data in the first uplink information in a thirteenth manner or a fourteenth manner, where the thirteenth manner is the first uplink grant, and the fourteenth manner is the second uplink grant; and/or when a physical random access channel of the terminal uses a second mode, the terminal transmits the data in the first uplink information in a fifteenth manner or a sixteenth manner, where the fifteenth manner is the third uplink grant, and the sixteenth manner is the fourth uplink grant, where the first mode is one or more of a coverage enhancement level 0, a coverage enhancement level 1, and a coverage enhancement mode A, and the second mode is one or more of a coverage enhancement level 2, a coverage enhancement level 3, and a coverage enhancement mode B.

In one embodiment, the first uplink information is uplink information associated with a MAC RAR in the MAC PDU; or the first uplink information is carried on a physical uplink shared channel, and the first uplink information is the first piece of uplink information after the MAC RAR; or the first uplink information is a message 3 in a random access procedure; or the first uplink information is uplink information between a message 3 in a random access procedure and a contention resolution message in a random access procedure; or the first uplink information is uplink information between a random access response message and a contention resolution message in a random access procedure.

According to a third aspect, this application provides a data transmission apparatus, including a processor and a memory, where the memory is configured to store an instruction, the processor is configured to execute the instruction stored in the memory, and when the processor executes the instruction stored in the memory, the apparatus is configured to perform the method according to the first aspect.

According to a fourth aspect, this application provides a data transmission apparatus, including a processor and a memory, where the memory is configured to store an instruction, the processor is configured to execute the instruction stored in the memory, and when the processor executes the instruction stored in the memory, the apparatus is configured to perform the method according to the second aspect.

According to a fifth aspect, this application provides a data transmission apparatus, including at least one processing unit (or chip) configured to perform the method in the first aspect.

According to a sixth aspect, this application provides a data transmission apparatus, including at least one processing unit (or chip) configured to perform the method in the second aspect.

According to a seventh aspect, this application provides a program. The program is used to perform the method in the first aspect when being executed by a processor.

According to an eighth aspect, this application provides a program product, for example, a computer readable storage medium, and the program product includes the program in the seventh aspect.

According to a ninth aspect, this application provides a program. The program is used to perform the method in the second aspect when being executed by a processor.

According to a tenth aspect, this application provides a program product, for example, a computer readable storage medium, and the program product includes the program in the ninth aspect.

According to an eleventh aspect, this application provides a computer readable storage medium. The computer readable storage medium stores an instruction. When the instruction is run on a computer, the computer is enabled to perform the method according to the first aspect.

According to a twelfth aspect, this application provides a computer readable storage medium. The computer readable storage medium stores an instruction. When the instruction is run on a computer, the computer is enabled to perform the method according to the second aspect.

According to the data transmission method and apparatus provided in this embodiment of this application, the base station receives the random access preamble sequence sent by the terminal, and sends the MAC PDU to the terminal based on the random access preamble sequence, where the MAC PDU includes the type indication field, and the type indication field is used to indicate the manner in which the terminal transmits the data in first uplink information, or may indicate a transport block with a larger size than an existing transport block, or a granularity of resource allocation is smaller than that in the prior art, so that resource allocation is more flexible, so that a delay of user data sent in a random access procedure is reduced, a data block is larger, and resource allocation is more flexible.

DESCRIPTION OF EMBODIMENTS

The following describes some terms in this application, so as to help a person skilled in the art have a better understanding.

(1) Terminal: The terminal is also referred to as user equipment (UE), and is a device providing a user with voice and/or data connectivity, for example, a handheld device or a vehicle-mounted device having a wireless connection function. A common terminal, for example, includes a mobile phone, a tablet computer, a notebook computer, a palmtop computer, a mobile Internet device (MID), and a wearable device such as a smartwatch, a smart band, or a pedometer.

(2) Base station: The base station is also referred to as a radio access network (RAN) device, is a device connecting a terminal to a wireless network, and includes but is not limited to an evolved NodeB (evolved Node B, eNB), a radio network controller (RNC), a NodeB (Node B, NB), a base station controller (BSC), a base transceiver station (BTS), a home eNodeB (Home evolved NodeB or Home Node B, HNB), and a baseband unit (BBU). In addition, the base station may further include a Wifi access point (AP) and the like.

(3) "A plurality of" refers to two or more than two. The term "and/or" describes an association relationship for describing associated objects and represents that three relationships may exist. For example, A and/or B may represent the following three cases: Only A exists, both A and B exist, and only B exists. The character "/" generally indicates an "or" relationship between the associated objects.

Technologies described in this specification may be applied to various communications systems, for example, 3G and 4G communications systems and a next-generation communications system, for example, a global system for mobile communications (GSM), a code division multiple access (CDMA) system, a time division multiple access (TDMA) system, a wideband code division multiple access (WCDMA) system, a frequency division multiple access (FDMA) system, an orthogonal frequency-division multiple access (OFDMA) system, a single-carrier FDMA (SC-FDMA) system, a general packet radio service (GPRS) system, a long term evolution (Long Term Evolution, LTE) system, a long term evolution advanced (LTE-A) system, or another similar communications system. As long as an entity in the communications system needs to communicate with another entity, the another entity needs to interpret advance data transmission in a specific manner.

Figure 1:
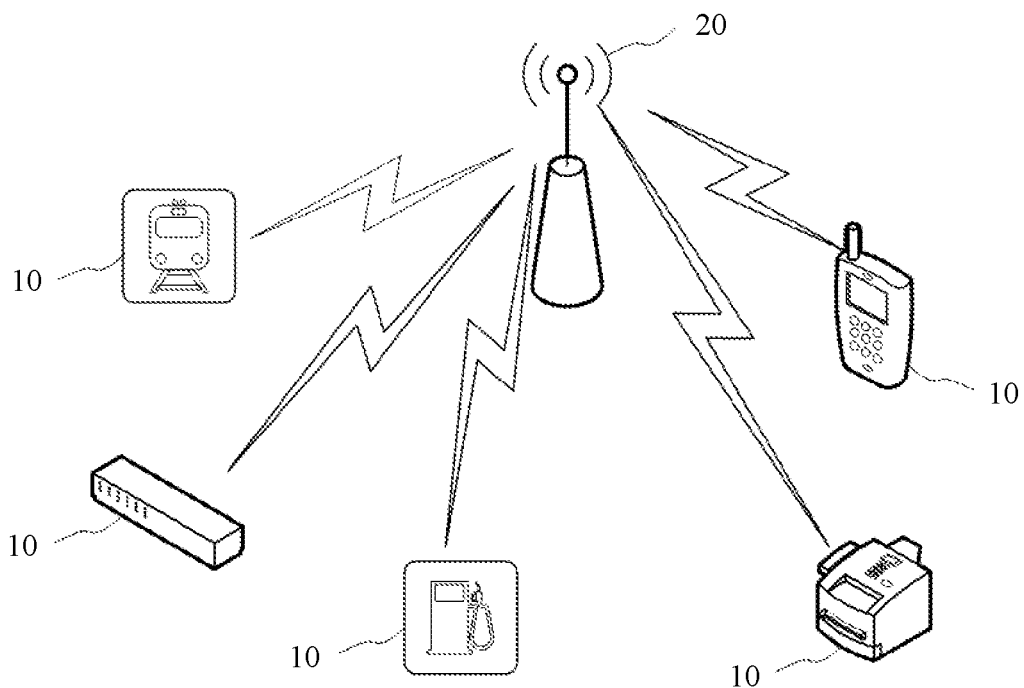
FIG. 1 is a system architecture diagram of a data transmission method according to an embodiment of this application.

FIG. 1 is an architectural diagram of a system of a data transmission method according to an embodiment of this application. As shown in FIG. 1, the system includes a base station 20 and a terminal 10. The terminal may include a device such as a personal communications service (PCS) phone, a session initiation protocol (SIP) phone, a wireless local loop (WLL) station, a personal digital assistant (PDA), or an access terminal. In the communications system, the terminal 10 sends a random access preamble sequence to the base station 20. After receiving the random access preamble sequence, the base station 20 sends a medium access control (MAC) packet data unit (PDU) to the terminal. The MAC PDU includes a type indication field, the type indication field is used to indicate a manner in which the terminal transmits data in first uplink information, and the terminal transmits the data in the first uplink information in a manner indicated by the type indication field. The type indication field indicates the manner in which the terminal transmits the data in the first uplink information, or may indicate a larger transport block size, or may indicate a smaller resource allocation granularity than that in the prior art, so that resource allocation is more flexible.

The following describes the technical solutions of this application in detail by using specific embodiments. The following several specific embodiments may be combined with each other, and concepts or processes that are the same or similar may not be repeatedly described in some embodiments.

Figure 2:
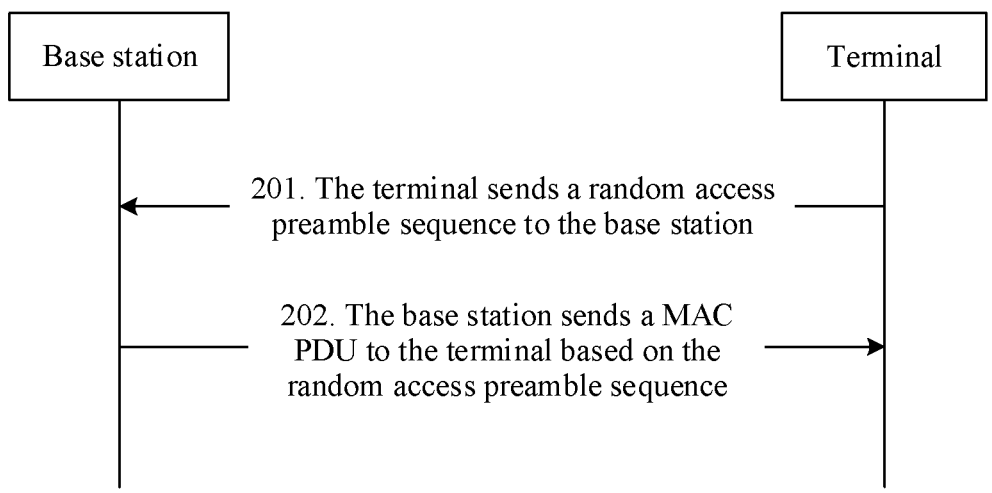
FIG. 2 is a signaling flowchart of Embodiment 1 of a data transmission method according to this application.

FIG. 2 is a signaling flowchart of Embodiment 1 of a data transmission method according to this application. This embodiment of this application provides a data transmission method. The method may be performed by any apparatus that performs a data transmission method, and the apparatus may be implemented by using software and/or hardware. In this embodiment, the apparatus may be integrated into a base station. As shown in FIG. 2, the method in this embodiment may include the following operations.

Operation 201: A terminal sends a random access preamble sequence to the base station.

Operation 202: The base station sends a MAC PDU to the terminal based on the random access preamble sequence.

The MAC PDU includes a type indication field, and the type indication field is used to indicate a manner in which the terminal transmits data in first uplink information.

Specifically, in a random access procedure, the terminal needs to send the random access preamble sequence to the base station, and the base station returns an RAR to the terminal based on the received random access preamble sequence. If the base station receives, within a same time, a plurality of random access preamble sequences sent by the terminal, the base station returns the MAC PDU to the terminal, to simultaneously respond to the plurality of random access preamble sequences sent by the terminal. A response to each random access preamble sequence corresponds to one MAC RAR in the MAC PDU. The MAC PDU carries the type indication field, to indicate the manner in which the terminal transmits the data in the first uplink information.

In one embodiment, the first uplink information is uplink information associated with the MAC RAR in the MAC PDU, and is specific information in a random access procedure. Specifically, the first uplink information is carried on a physical uplink shared channel, and the first uplink information is the first piece of uplink information after the MAC RAR. Alternatively, the first uplink information is a message 3 in a random access procedure. Alternatively, the first uplink information is uplink information between a message 3 in a random access procedure and a contention resolution message in a random access procedure. Alternatively, the first uplink information is uplink information between a random access response message and a contention resolution message in a random access procedure.

Figure 3:
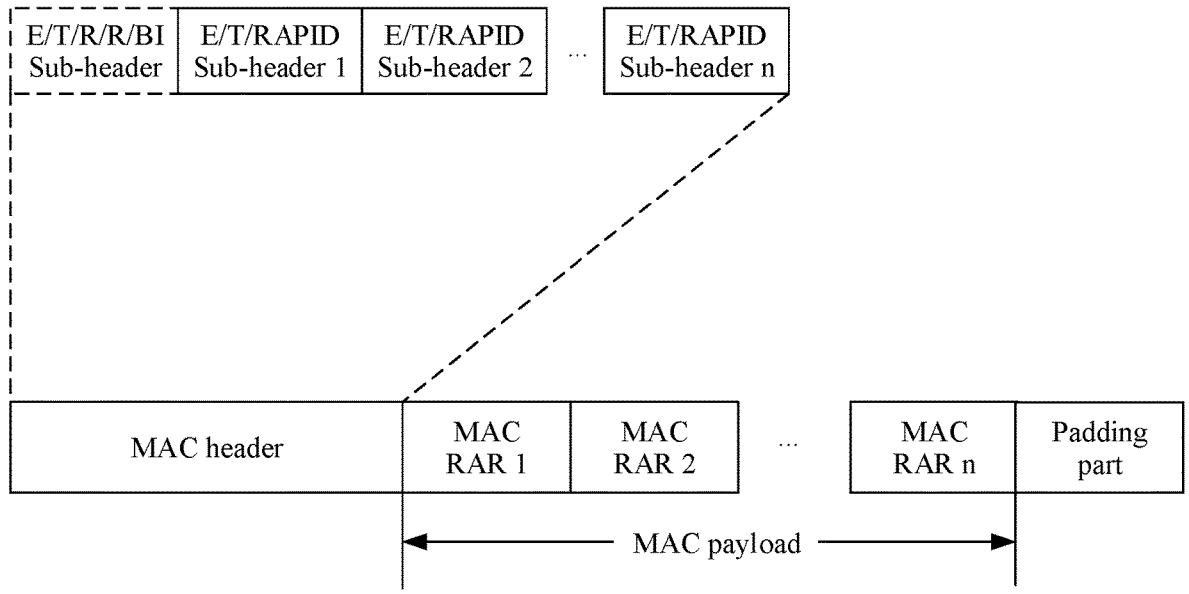
FIG. 3 is a schematic structural diagram of a MAC PDU.

FIG. 3 is a schematic structural diagram of a MAC PDU. As shown in FIG. 3, the MAC PDU includes one MAC header, zero or more MAC RARs, and an optional padding part. The MAC RAR is a payload part of the MAC PDU. Based on the structure of the MAC PDU shown in FIG. 3, a location at which the foregoing type indication field is located in the MAC PDU may include the following two cases:

Case 1: The type indication field is located in the MAC RAR of the MAC PDU.

Figure 4:
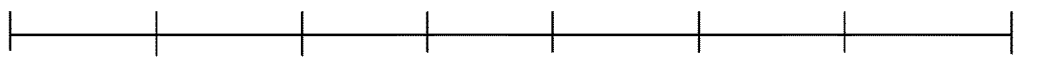
FIG. 4 is a schematic structural diagram of a MAC RAR.

Specifically, FIG. 4 is a schematic structural diagram of a MAC RAR. As shown in FIG. 4, in the MAC RAR, an octet 1 (Oct1) includes R and a timing advance command (Timing Advance Command), an octet 2 (Oct2) includes a timing advance command and an uplink scheduling grant (UL Grant), an octet 3 (Oct3) and an octet 4 (Oct4) each include a UL grant, and an octet 5 (Oct5) and an octet 6 (Oct6) each include a temporary radio network identifier (Temporary C-RNTI) field. R is a reserved bit, and is usually set to "0". The timing advance command indicates an index value of a timing advance value: TA (0, 1, 2, . . . , and 1282), and is used to control a timing adjustment amount. The timing advance command occupies 11 bits, the UL grant indicates a resource used for uplink transmission, and the temporary C-RNTI indicates a temporary radio network temporary identifier.

When the type indication field is located in the MAC RAR, as shown in FIG. 4, because the first bit of Oct1 in the MAC RAR is a reserved bit, the type indication field includes one bit, and the bit included in the type indication field is the first bit in the MAC RAR, namely, the reserved bit R in FIG. 4. For example, when the reserved bit R is set to 1, in other words, a value of the type indication field is 1, the terminal may be instructed to transmit the data in the first uplink information in a first manner. The first manner is a first uplink grant, and the first uplink grant instructs the terminal to determine, in a first query manner, a transport block size for transmitting the first uplink information. When the type indication field is 0, the type indication field instructs the terminal to transmit the data in the first uplink information in a second manner. The second manner is a second uplink grant, and the second uplink grant instructs the terminal to determine, in a second query manner, the transport block size for transmitting the first uplink information. A maximum transport block size TBS determined by the terminal in the first query manner is less than a maximum TBS determined in the second query manner. In addition, a quantity of bits occupied by the first uplink grant and a quantity of bits occupied by the second uplink grant may be the same, or may be different. The second uplink grant is grant information obtained by re-interpreting a specific field or some specific fields in the first uplink grant, and the field is used to indicate an MCS or a value of the TBS.

The following describes the first query manner in detail. Table 1 shows a structure of an uplink grant field.

TABLE 1

| DCI content | CE (coverage enhancement) mode A | CEmodeB |
|---|---|---|
| Msg3 PUSCH narrowband index | $N_{NB}^{index}$ | 2 |
| Msg3 PUSCH resource configuration | 4 | 3 |
| Quantity of repeated Msg3 PUSCHs | 2 | 3 |
| MCS | 3 | 0 |
| TBS | 0 | 2 |
| TPC | 3 | 0 |
| CSI request | 1 | 0 |
| UL delay | 1 | 0 |
| Msg3/4 MPDCCH narrowband index | 2 | 2 |
| Zero padding | $4-N_{NB}^{index}$ | 0 |
| Total Nr-bits | 20 | 12 |

A type 0 uplink resource allocation manner is only applicable to BL/CE UE for which a coverage level A is configured. A resource indicator value of the type 0 uplink resource allocation manner is defined as follows:

If $(L_{CRBs}-1) \leq \lfloor N_{RB}^{UL}/2 \rfloor$, $RIV=N_{RB}^{UL}(L_{CRBs}-1)+RB_{START}$; or otherwise, $RIV=N_{RB}^{UL}(N_{RB}^{UL}-L_{CRBs}+1)+(N_{RB}^{UL}-1-RB_{START})$.

Herein, $N_{RB}^{UL}=6$, $RB_{START}$ indicates a start resource block, that $L_{CRBs} \geq 1$ indicates a length of an allocated resource block, and RIV is a resource indicator value included in a resource allocation field.

Figure 5:
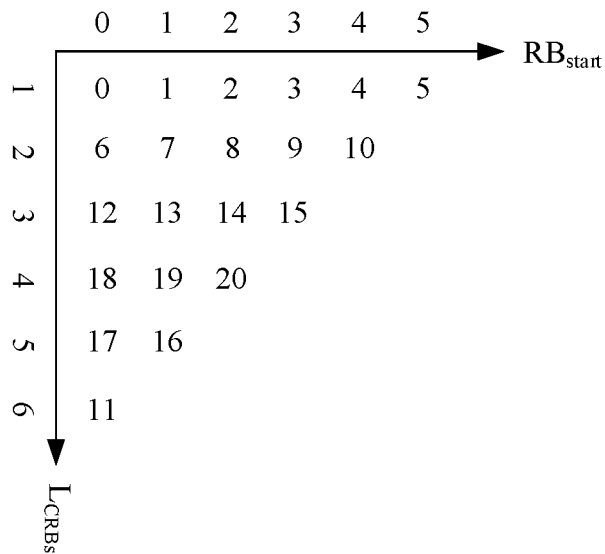
FIG. 5 is a resource indication diagram of a Type 0 of a BL/CE UE of a coverage level A.

FIG. 5 is a diagram of a type 0 resource indication of BL/CE UE with a coverage level A. As shown in FIG. 5, the first row to the third row in FIG. 5 are possible resource indicator values (resource indication value, RIV), and a possible quantity of allocated physical resource blocks (physical resource block, PRB) is 1, 2, 3, or 6.

According to Table 1, in an existing CE Mmode A, a Msg3 PUSCH resource allocation field includes four bits, which can only indicate that the RIV ranges from 0 to 15. A corresponding quantity of allocated PRBs is 1, 2, 3, or 6. A shortened MCS indication field includes three bits, and a corresponding modulation and coding scheme (modulation coding scheme, MCS) index is a value from 0 to 7. Table 2 shows a TBS of a Msg3 in an existing CE Mmode A.

TABLE 2

| | $N_{PRB}$ | | | | | | | | | |
|---|---|---|---|---|---|---|---|---|---|---|
| $I_{TBS}$ | 1 | 2 | 3 | 4 | 5 | 6 | 7 | 8 | 9 | 10 |
| 0 | 16 | 32 | 56 | 88 | 120 | 152 | 176 | 208 | 224 | 256 |
| 1 | 24 | 56 | 88 | 144 | 176 | 208 | 224 | 256 | 328 | 344 |
| 2 | 32 | 72 | 144 | 176 | 208 | 256 | 296 | 328 | 376 | 424 |
| 3 | 40 | 104 | 176 | 208 | 256 | 328 | 392 | 440 | 504 | 568 |
| 4 | 56 | 120 | 208 | 256 | 328 | 408 | 488 | 552 | 632 | 696 |
| 5 | 72 | 144 | 224 | 328 | 424 | 504 | 600 | 680 | 776 | 872 |
| 6 | 328 | 176 | 256 | 392 | 504 | 600 | 712 | 808 | 936 | 1032 |
| 7 | 104 | 224 | 328 | 472 | 584 | 712 | 840 | 968 | 1096 | 1224 |

A type 2 uplink resource allocation manner is only applicable to BL/CE UE for which a coverage level B is configured.

Table 3 shows a resource indication field.

TABLE 3

| Value of resource allocation field (value of resource allocation field) | Allocated resource blocks (allocated resource blocks) |
|---|---|
| '000' | 0 |
| '001' | 1 |
| '010' | 2 |
| '011' | 3 |
| '100' | 4 |
| '101' | 5 |
| '110' | 0 and 1 |
| '111' | 2 and 3 |

In an existing CE Mode B, a resource allocation field includes three bits, but only indicates two cases of three PRBs and six PRBs. A shortened TBS index indication field includes two bits, indicating that a TBS index ranges from 0 to 3. Table 4 shows a TBS of a Msg3 in an existing CE Mmode B.

TABLE 4

| | $N_{PRB}$ | | | | | | | | | |
|---|---|---|---|---|---|---|---|---|---|---|
| $I_{TBS}$ | 1 | 2 | 3 | 4 | 5 | 6 | 7 | 8 | 9 | 10 |
| 0 | 16 | 32 | 56 | 88 | 120 | 152 | 176 | 208 | 224 | 256 |
| 1 | 24 | 56 | 88 | 144 | 176 | 208 | 224 | 256 | 328 | 344 |
| 2 | 32 | 72 | 144 | 176 | 208 | 256 | 296 | 328 | 376 | 424 |
| 3 | 40 | 104 | 176 | 208 | 256 | 328 | 392 | 440 | 504 | 568 |

According to Table 3 and Table 4, a maximum TBS that can be supported by the existing Msg3 is 712 bits and 328 bits for the Mode A and the Mode B respectively. The terminal determines $N_{PRB}$ based on Msg3 PUSCH resource configuration information in an uplink grant field in the MAC RAR, determines $I_{TBS}$ based on TBS or MCS information in the uplink grant field in the MAC RAR, and queries Table 2 or Table 4 based on $N_{PRB}$ and $I_{TBS}$ to determine a transport block size, namely, the first query manner. The determined maximum TBS is 712 bits and 328 bits for the Mode A and the Mode B respectively.

The following describes the second query manner in detail.

The values in Table 2 and Table 4 are changed in the following. Table 5 shows a TBS of a Msg3 when the CE Mode A is changed.

TABLE 5

| | $N_{PRB}$ | | | | | | | | | |
|---|---|---|---|---|---|---|---|---|---|---|
| $I_{TBS}$ | 1 | 2 | 3 | 4 | 5 | 6 | 7 | 8 | 9 | 10 |
| 0 | 16 | 32 | 56 | 88 | 120 | 352 | 176 | 208 | 224 | 256 |
| 1 | 24 | 56 | 88 | 144 | 176 | 408 | 224 | 256 | 328 | 344 |
| 2 | 32 | 72 | 144 | 176 | 208 | 456 | 296 | 328 | 376 | 424 |
| 3 | 40 | 104 | 176 | 208 | 256 | 528 | 392 | 440 | 504 | 568 |
| 4 | 56 | 120 | 208 | 256 | 328 | 608 | 488 | 552 | 632 | 696 |
| 5 | 72 | 144 | 224 | 328 | 424 | 704 | 600 | 680 | 776 | 872 |
| 6 | 328 | 176 | 256 | 392 | 504 | 800 | 712 | 808 | 936 | 1032 |
| 7 | 104 | 224 | 328 | 472 | 584 | 912 | 840 | 968 | 1096 | 1224 |

Table 6 shows a TBS of a Msg3 when the CE Mode B is changed.

TABLE 6

| | $N_{PRB}$ | | | | | | | | | |
|---|---|---|---|---|---|---|---|---|---|---|
| $I_{TBS}$ | 1 | 2 | 3 | 4 | 5 | 6 | 7 | 8 | 9 | 10 |
| 0 | 16 | 32 | 56 | 88 | 120 | 652 | 176 | 208 | 224 | 256 |
| 1 | 24 | 56 | 88 | 144 | 176 | 708 | 224 | 256 | 328 | 344 |

TABLE 6-continued

| $I_{TBS}$ | $N_{PRB}$ | | | | | | | | | |
|---|---|---|---|---|---|---|---|---|---|---|
| | 1 | 2 | 3 | 4 | 5 | 6 | 7 | 8 | 9 | 10 |
| 2 | 32 | 72 | 144 | 176 | 208 | 756 | 296 | 328 | 376 | 424 |
| 3 | 40 | 104 | 176 | 208 | 256 | 828 | 392 | 440 | 504 | 568 |

The terminal determines $N_{PRB}$ based on Msg3 PUSCH resource configuration information in an uplink grant field in the MAC RAR, determines $I_{TBS}$ based on TBS or MCS information in the uplink grant field in the MAC RAR, and queries Table 5 or Table 6 based on $N_{PRB}$ and $I_{TBS}$ to determine a transport block size, namely, the second query manner. The determined maximum TBS is 912 bits and 828 bits for the Mode A and the Mode B respectively.

In this case, maximum TB sizes that can be supported by the CE Mode A and the CE Mode B are respectively 912 and 828.

Figure 6:
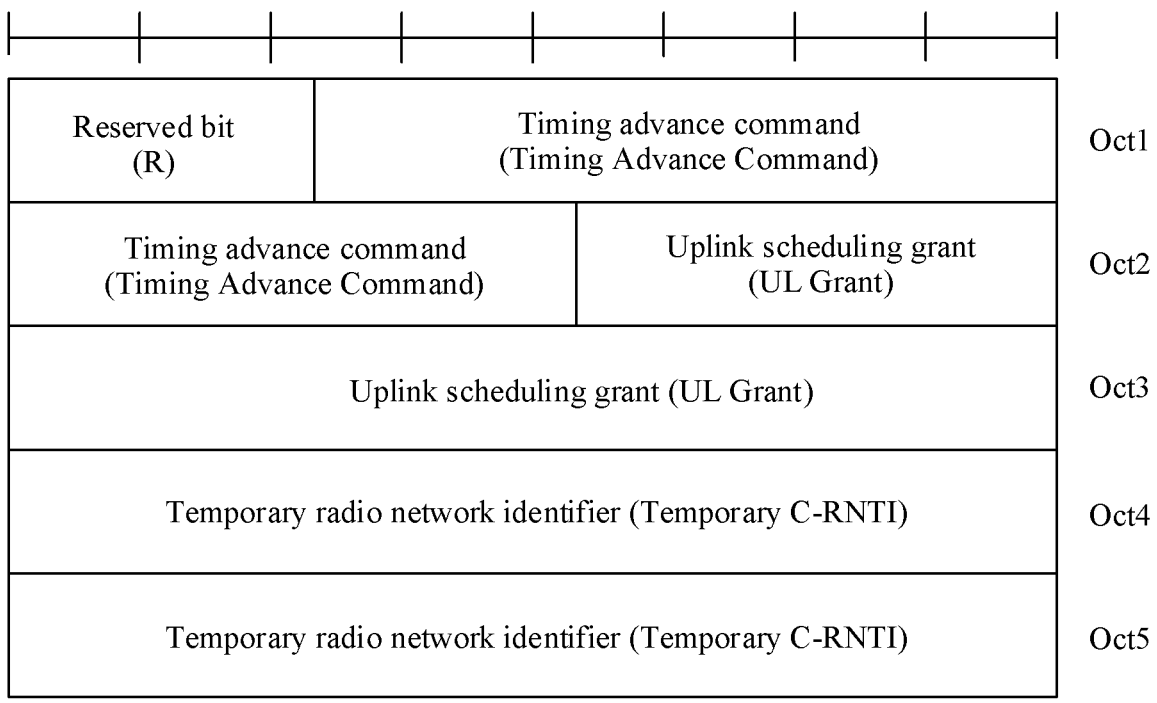
FIG. 6 is another schematic structural diagram of a MAC RAR.

In addition, FIG. 6 is another schematic structural diagram of the MAC RAR. As shown in FIG. 6, for a terminal with a coverage level of ⅔ and a coverage enhanced terminal, in the MAC RAR, an octet 1 (Oct1) includes R and a timing advance command (Timing Advance Command), an octet 2 (Oct2) includes a timing advance command and an uplink scheduling grant (UL Grant), an octet 3 (Oct3) includes a UL grant, and an octet 4 (Oct4) and an octet 5 (Oct5) each include a temporary radio network identifier (Temporary C-RNTI) field. R is reserved bit, and is usually set to "0". The timing advance command indicates an index value of a timing advance value: TA (0, 1, 2, ..., and 1282), and is used to control a timing adjustment amount. The timing advance command occupies 11 bits, the UL grant indicates a resource used for uplink transmission, and the temporary C-RNTI indicates a temporary radio network temporary identifier.

Similar to FIG. 1, when the type indication field is located in the MAC RAR, as shown in FIG. 6, because the first bit in the MAC RAR is a reserved bit, the type indication field includes one bit, and the bit included in the type indication field is the first bit in the MAC RAR, namely, the reserved bit R in FIG. 6.

In one embodiment, when the reserved bit R is set to 1, in other words, a value of the type indication field is 1, the terminal is instructed to transmit the data in the first uplink information in a first manner. The first manner is a first uplink grant. When the type indication field is 0, the type indication field indicates that the terminal transmits the data in the first uplink information in a second manner. The second manner is a second uplink grant. The first uplink grant and the second uplink grant are similar to those generated when the type indication field is located in the first bit of Oct1. Details are not described herein again. In addition, a quantity of bits occupied by the first uplink grant and a quantity of bits occupied by the second uplink grant may be the same, or may be different. The second uplink grant is grant information obtained by re-interpreting a specific field or some specific fields in the first uplink grant, and the field is used to indicate an MCS or a value of the TBS.

In one embodiment, when the type indication field is 1, the type indication field indicates that the terminal transmits the data in the first uplink information in a third manner. The third manner is a third uplink grant. When the type indication field is 0, the type indication field indicates that the terminal transmits the data in the first uplink information in a fourth manner. The fourth manner is a fourth uplink grant. The third uplink grant indicates that the terminal allocates a resource in a unit of a physical resource block, and the resource allocated by using the third uplink grant is greater than or equal to one physical resource block. A resource allocated by using the fourth uplink grant is less than one physical resource block. In addition, a quantity of bits occupied by the third uplink grant and a quantity of bits occupied by the fourth uplink grant may be the same, or may be different. The third uplink grant is grant information obtained by re-interpreting a specific field or some specific fields in the fourth uplink grant, and the field is used to indicate resource allocation information.

In one embodiment, when the type indication field is 1, the type indication field indicates that the terminal transmits the data in the first uplink information in a fifth manner. The fifth manner is a second uplink grant. When the type indication field is 0, the type indication field indicates that the terminal transmits the data in the first uplink information in a sixth manner. The sixth manner is a fourth uplink grant. The second uplink grant indicates that the terminal determines, in a second query manner, a transport block size for transmitting the first uplink information, and a resource allocated by using the fourth uplink grant is less than one physical resource block.

Figure 7:
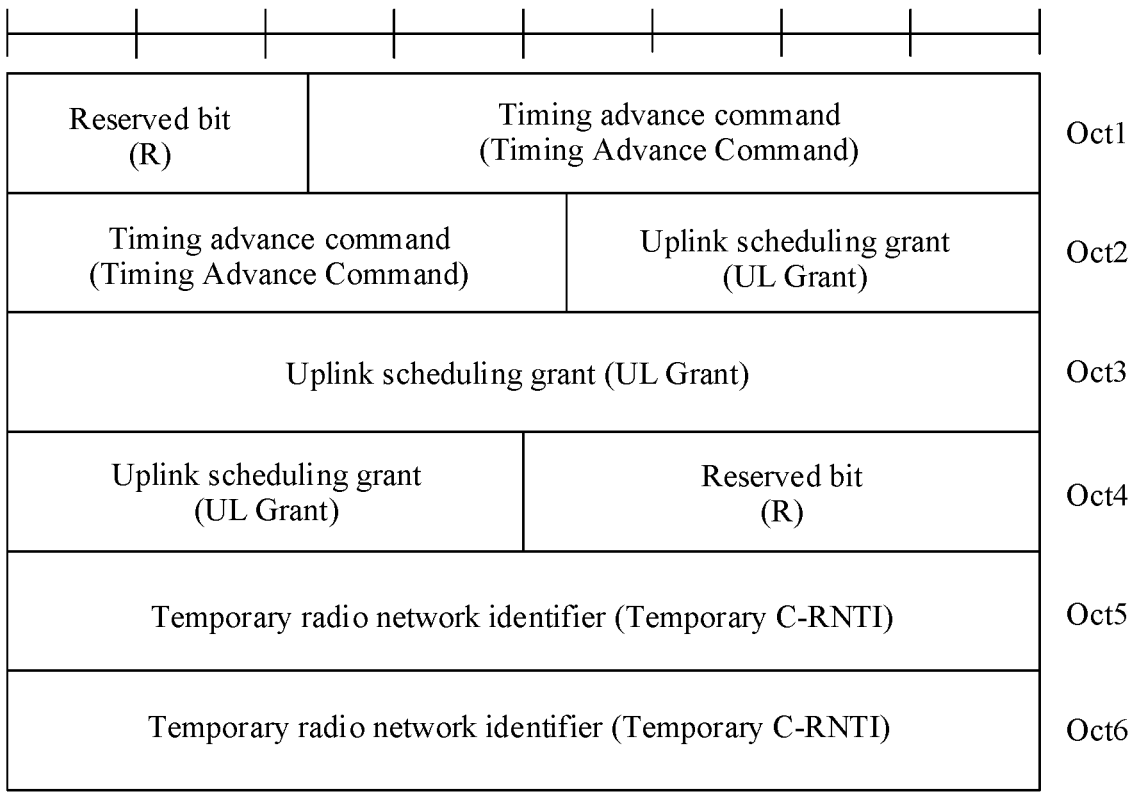
FIG. 7 is still another schematic structural diagram of a MAC RAR.

In addition, FIG. 7 is another schematic structural diagram of the MAC RAR. As shown in FIG. 7, for a narrowband internet of things terminal, in the MAC RAR, an octet 1 (Oct1) includes a reserved bit R and a timing advance command, an octet 2 (Oct2) includes a timing advance command and an uplink scheduling grant (UL Grant), an octet 3 (Oct3) includes a UL grant, an octet 4 (Oct4) includes a UL grant and a reserved bit R, and an octet 5 (Oct5) and an octet 6 (Oct6) each include a temporary radio network identifier (C-RNTI) field. R is a reserved bit, and is usually set to "0". The timing advance command indicates an index value of a timing advance value: TA (0, 1, 2, ..., and 1282), and is used to control a timing adjustment amount. The timing advance command occupies 11 bits, the UL grant indicates a resource used for uplink transmission, and the temporary C-RNTI indicates a temporary radio network temporary identifier.

When the type indication field is located in the MAC RAR, as shown in FIG. 7, because both Oct1 and Oct4 in the MAC RAR include a reserved bit R, a bit included in the type indication field may be the first bit in the MAC RAR, or may be at least one of the $1^{st}$, $28^{th}$, $29^{th}$, $30^{th}$, $31^{st}$, or $32^{nd}$ bit in the MAC RAR, namely, a reserved bit R in Oct1 or Oct4 in FIG. 7.

In one embodiment, when a bit included in the type indication field is the first bit in the MAC RAR, the terminal is instructed to transmit the data in the first uplink information in a first manner when R in Oct1 is set to 1 or when R in Oct4 is set to 1. The first manner is a first uplink grant. When the type indication field is 0, the type indication field indicates that the terminal transmits the data in the first uplink information in a second manner. The second manner is a second uplink grant. In addition, a quantity of bits occupied by the first uplink grant and a quantity of bits occupied by the second uplink grant may be the same, or may be different. The second uplink grant is grant information obtained by re-interpreting a specific field or some specific fields in the first uplink grant, and the field is used to indicate an MCS or a value of the TBS.

In one embodiment, when the type indication field is 1, the type indication field indicates that the terminal transmits the data in the first uplink information in a third manner. The third manner is a third uplink grant. When the type indication field is 0, the type indication field indicates that the terminal transmits the data in the first uplink information in a fourth manner. The fourth manner is a fourth uplink grant. The third uplink grant indicates that the terminal allocates a resource in a unit of a physical resource block, and the resource allocated by using the third uplink grant is greater than or equal to one physical resource block. A resource allocated by using the fourth uplink grant is less than one physical resource block. In addition, a quantity of bits occupied by the third uplink grant and a quantity of bits occupied by the fourth uplink grant may be the same, or may be different. The third uplink grant is grant information obtained by re-interpreting a specific field or some specific fields in the fourth uplink grant, and the field is used to indicate resource allocation information.

In one embodiment, when the type indication field is 1, the type indication field indicates that the terminal transmits the data in the first uplink information in a fifth manner. The fifth manner is a second uplink grant. When the type indication field is 0, the type indication field indicates that the terminal transmits the data in first uplink information in a sixth manner. The sixth manner is a fourth uplink grant. The second uplink grant indicates that the terminal determines, in a second query manner, a transport block size for transmitting the first uplink information, and a resource allocated by using the fourth uplink grant is less than one physical resource block.

In this embodiment, the reserved bit in the MAC RAR is used as the type indication field, to indicate a manner in which the terminal transmits data in the first uplink information. In this way, the terminal is instructed without increasing MAC PDU overheads, so as to reduce network signaling overheads.

Case 2: The type indication field is located in a MAC header of the MAC PDU.

Figure 8:
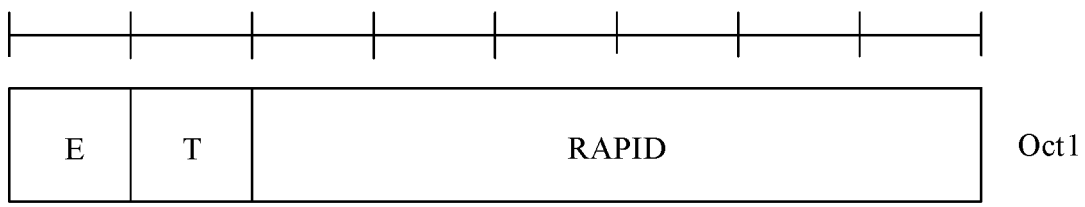
FIG. 8 is a schematic structural diagram of a sub-header.

In one embodiment, still referring to FIG. 3, one MAC RAR in the MAC PDU corresponds to one sub-header in the MAC header of the MAC PDU, for example, a MAC RAR 1 corresponds to a sub-header 1, and a MAC RAR 2 corresponds to a sub-header 2. FIG. 8 is a schematic structural diagram of a sub-header. As shown in FIG. 8, the sub-header may be the $m^{th}$ sub-header in the MAC header, and m is a positive integer greater than or equal to 2. The sub-header includes eight bits, the first bit E in the sub-header is an extended field, the second bit T in the sub-header is a type indication field, and the third bit to the eighth bit RAPID in the sub-header are used to indicate a random access preamble identifier.

The extended field E is used to indicate whether the MAC header includes more sub-headers. For example, if "E" is set to "1", it indicates that there is at least another sub-header after the sub-header. If "E" is set to "0", it indicates that a byte after the sub-header is the MAC RAR or padding content. The RAPID is used to indicate or determine a random access sequence. The RAPID occupies six bits. The type indication field T is used to indicate a manner in which the terminal transmits data in the first uplink information.

In one embodiment, when the type indication field T is set to 0, the type indication field indicates that the terminal transmits the data in the first uplink information in a seventh manner. The seventh manner is a first uplink grant. When the type indication field is 1, the type indication field indicates that the terminal transmits the data in the first uplink information in an eighth manner. The eighth manner is a second uplink grant. A quantity of bits included in the first uplink grant is the same as a quantity of bits included in the second uplink grant. The first uplink grant indicates that the terminal determines, in a first query manner, a transport block size for transmitting the first uplink information, the second uplink grant indicates that the terminal determines, in a second query manner, the transport block size for transmitting the first uplink information, and a maximum transport block size TBS determined in the first query manner is less than a maximum TBS determined in the second query manner. In addition, a quantity of bits occupied by the first uplink grant and a quantity of bits occupied by the second uplink grant may be the same, or may be different. The second uplink grant is grant information obtained by re-interpreting a specific field or some specific fields in the first uplink grant, and the field is used to indicate an MCS or a value of the TBS.

In one embodiment, when the type indication field is 0, the type indication field indicates that the terminal transmits the data in the first uplink information in a ninth manner. The ninth manner is a third uplink grant. When the type indication field is 1, the type indication field indicates that the terminal transmits the data in the first uplink information in a tenth manner. The tenth manner is a fourth uplink grant. A quantity of bits included in the third uplink grant is the same as a quantity of bits included in the fourth uplink grant. The third uplink grant indicates that the terminal allocates a resource in a unit of a physical resource block, and the resource allocated by using the third uplink grant is greater than or equal to one physical resource block. A resource allocated by using the fourth uplink grant is less than one physical resource block. In addition, a quantity of bits occupied by the third uplink grant and a quantity of bits occupied by the fourth uplink grant may be the same, or may be different. The third uplink grant is grant information obtained by re-interpreting a specific field or some specific fields in the fourth uplink grant, and the field is used to indicate resource allocation information.

In one embodiment, when the type indication field is 0, the type indication field indicates that the terminal transmits the data in the first uplink information in an eleventh manner. The eleventh manner is a second uplink grant. When the type indication field is 1, the type indication field indicates that the terminal transmits the data in the first uplink information in a twelfth manner. The twelfth manner is a fourth uplink grant. A quantity of bits included in the second uplink grant is the same as a quantity of bits included in the fourth uplink grant. The second uplink grant indicates that the terminal determines, in a second query manner, a transport block size for transmitting the first uplink information, and a resource allocated by using the fourth uplink grant is less than one physical resource block.

In another optional implementation, the MAC header of the MAC PDU includes L first sub-headers, each first sub-header includes n type indication fields, and each type indication field corresponds to one MAC RAR in the MAC PDU, where n is a positive integer, and L is a positive integer greater than or equal to 1.

Figure 9:
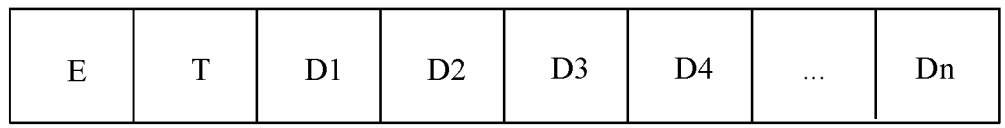
FIG. 9 is a schematic structural diagram of a first sub-header.

Specifically, FIG. 9 is a schematic structural diagram of a first sub-header. As shown in FIG. 9, each first sub-header includes n type indication fields, and each type indication field corresponds to one MAC RAR in the MAC PDU. For example, D1 corresponds to a MAC RAR 1, and D2 corresponds to a MAC RAR 2.

As shown in FIG. 9, an extended field E is used to indicate whether the MAC header includes more sub-headers. For example, if "E" is set to "1", it indicates that there is at least another sub-header after the sub-header. If "E" is set to "0", it indicates that a byte after the sub-header is the MAC RAR or padding content. A type field T is used to indicate that the third bit to the eighth bit in the first sub-header are configured as the type indication field. D1 to Dn in the first sub-header may be used as the type indication field, and the n type indication fields indicate a manner in which the terminal transmits data in the first uplink information.

In one embodiment, when D1 is set to 1, the terminal is instructed to transmit the data in the first uplink information in a first manner. The first manner is a first uplink grant. When the type indication field is 0, the type indication field indicates that the terminal transmits the data in the first uplink information in a second manner. The second manner is a second uplink grant. In addition, a quantity of bits occupied by the first uplink grant and a quantity of bits occupied by the second uplink grant may be the same, or may be different. The second uplink grant is grant information obtained by re-interpreting a specific field or some specific fields in the first uplink grant, and the field is used to indicate an MCS or a value of the TBS.

In one embodiment, when the type indication field is 1, the type indication field indicates that the terminal transmits the data in the first uplink information in a third manner. The third manner is a third uplink grant. When the type indication field is 0, the type indication field indicates that the terminal transmits the data in the first uplink information in a fourth manner. The fourth manner is a fourth uplink grant. In addition, a quantity of bits occupied by the third uplink grant and a quantity of bits occupied by the fourth uplink grant may be the same, or may be different. The third uplink grant is grant information obtained by re-interpreting a specific field or some specific fields in the fourth uplink grant, and the field is used to indicate resource allocation information.

In one embodiment, when the type indication field is 1, the type indication field indicates that the terminal transmits the data in the first uplink information in a fifth manner. The fifth manner is a second uplink grant. When the type indication field is 0, the type indication field indicates that the terminal transmits the data in the first uplink information in a sixth manner. The sixth manner is a fourth uplink grant.

In one embodiment, when the type indication field is 0, the type indication field indicates that the terminal transmits the data in the first uplink information in a seventh manner. The seventh manner is a first uplink grant. When the type indication field is 1, the type indication field indicates that the terminal transmits the data in the first uplink information in an eighth manner. The eighth manner is a second uplink grant. In addition, a quantity of bits occupied by the first uplink grant and a quantity of bits occupied by the second uplink grant may be the same, or may be different. The second uplink grant is grant information obtained by re-interpreting a specific field or some specific fields in the first uplink grant, and the field is used to indicate an MCS or a value of the TBS.

In one embodiment, when the type indication field is 0, the type indication field indicates that the terminal transmits the data in the first uplink information in a ninth manner. The ninth manner is a third uplink grant. When the type indication field is 1, the type indication field indicates that the terminal transmits the data in the first uplink information in a tenth manner. The tenth manner is a fourth uplink grant. In addition, a quantity of bits occupied by the third uplink grant and a quantity of bits occupied by the fourth uplink grant may be the same, or may be different. The third uplink grant is grant information obtained by re-interpreting a specific field or some specific fields in the fourth uplink grant, and the field is used to indicate resource allocation information.

In one embodiment, when the type indication field is 0, the type indication field indicates that the terminal transmits the data in the first uplink information in an eleventh manner. The eleventh manner is a second uplink grant. When the type indication field is 1, the type indication field indicates that the terminal transmits the data in the first uplink information in a twelfth manner. The twelfth manner is a fourth uplink grant.

Indication manners of D2, D3, . . . , and Dn are similar to the indication manner of D1. Details are not described herein again.

In one embodiment, as shown in FIG. 9, each first sub-header includes eight bits, and the first bit of each first sub-header is an extended field E, the second bit is a type field T, and the type field T is used to indicate that the third bit to the eighth bit in the first sub-header are configured as the type indication field.

Specifically, a function of the extended field E is similar to a function of the extended field in FIG. 8. Details are not described herein again. When the type field T of the sub-header is set to 0, each of the third bit to the eighth bit of the sub-header corresponds to one type indication field. In other words, D1 to Dn are separately used to indicate manners in which the terminal transmits data in the first uplink information.

In addition, In one embodiment, the L first sub-headers may be the last L sub-headers in the MAC header, and the L first sub-headers do not include the first sub-header in the MAC header, or the L first sub-headers are the first L sub-headers in the MAC header other than the first sub-header.

The MAC header may include backoff to indicate a sub-header. In this case, the sub-header including the backoff is the first sub-header in the MAC header. Therefore, the L first sub-headers may be the last L sub-headers in the MAC header, and the L first sub-headers do not include the first sub-header in the MAC header, or may be the first L sub-headers in the MAC header other than the first sub-header.

In one embodiment, when a physical random access channel of the terminal uses a first mode, the terminal transmits the data in the first uplink information in a thirteenth manner or a fourteenth manner, where the thirteenth manner is the first uplink grant, and the fourteenth manner is the second uplink grant; and/or when a physical random access channel of the terminal uses a second mode, the terminal transmits the data in the first uplink information in a fifteenth manner or a sixteenth manner, where the fifteenth manner is the third uplink grant, and the sixteenth manner is the fourth uplink grant. The first mode is one or more of a coverage enhancement level 0, a coverage enhancement level 1, and a coverage enhancement mode A, and the second mode is one or more of a coverage enhancement level 2, a coverage enhancement level 3, and a coverage enhancement mode B.

Specifically, similar to the foregoing description, the first uplink grant indicates that the terminal determines, in a first query manner, a transport block size for transmitting the first uplink information. The second uplink grant indicates that the terminal determines, in a second query manner, the transport block size for transmitting the first uplink information. The third uplink grant indicates that the terminal allocates a resource in a unit of a physical resource block, and the resource allocated by using the third uplink grant is greater than or equal to one physical resource block. A resource allocated by using the fourth uplink grant is less than one physical resource block. A maximum transport block size TBS determined in the first query manner is less than a maximum TBS determined in the second query manner.

In one embodiment, the $x^{th}$ type indication field in the first sub-header corresponds to the $x^{th}$ MAC RAR in the MAC PDU, where x is a positive integer.

For example, if there are five first sub-headers in the MAC header in total, because the first bit and the second bit of each first sub-header are respectively an extended field and a type field, there are 30 bits in total that correspond to 30 type indication fields other than the first bit and the second bit of each first sub-header. The first bit of the 30 bits corresponds to the first MAC RAR, the second bit of the 30 bits corresponds to the second MAC RAR, and so on.

In this embodiment, the manner in which the terminal transmits the data in the first uplink information is indicated by using a field of the first sub-header in the MAC header, so that the terminal is instructed more easily.

According to the data transmission method provided in this embodiment of this application, the base station receives the random access preamble sequence sent by the terminal, and sends the MAC PDU to the terminal based on the random access preamble sequence. The MAC PDU includes the type indication field, and the type indication field is used to indicate the manner in which the terminal transmits the data in the first uplink information. The type indication field in the MAC PDU may be used to indicate the manner in which the terminal transmits the data in the first uplink information, or may indicate a larger transport block than an existing transport block size, or may indicate a smaller resource allocation granularity than that in the prior art, so that resource allocation is more flexible. In this way, a delay of user data sent in a random access procedure is reduced, a data block is larger, and resource allocation is more flexible.

Figure 10:
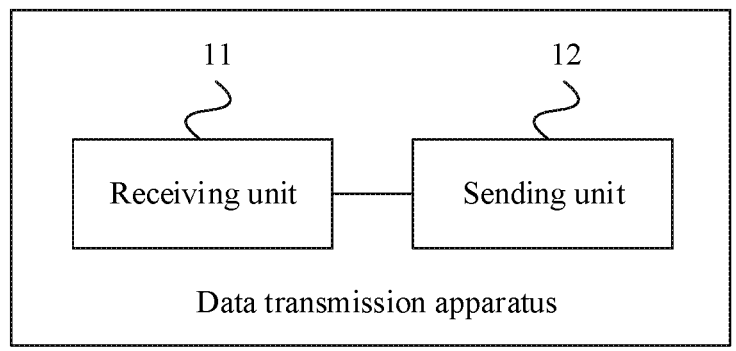
FIG. 10 is a schematic structural diagram of a data transmission apparatus in Embodiment 1 according to this application.

FIG. 10 is a schematic structural diagram of a data transmission apparatus in Embodiment 1 according to this application. The apparatus may be located in a base station. Referring to FIG. 10, the apparatus includes a receiving unit 11 and a sending unit 12.

The receiving unit 11 is configured to receive a random access preamble sequence sent by a terminal.

The sending unit 12 is configured to send a media access control MAC packet data unit PDU to the terminal based on the random access preamble sequence, where the MAC PDU includes a type indication field, and the type indication field is used to indicate a manner in which the terminal transmits data in first uplink information.

In one embodiment, the type indication field is located in a MAC random access response RAR of the MAC PDU.

In one embodiment, the type indication field is located in a MAC header of the MAC PDU.

In one embodiment, the type indication field includes one bit, and the bit included in the type indication field is the first bit in the MAC RAR; or the bit included in the type indication field is at least one of the $1^{st}$, $28^{th}$, $29^{th}$, $30^{th}$, $31^{st}$, or $32^{nd}$ bit in the MAC RAR.

In one embodiment, one MAC RAR in the MAC PDU corresponds to one sub-header in the MAC header of the MAC PDU, the sub-header includes eight bits, the sub-header is the $m^{th}$ sub-header in the MAC header, and m is a positive integer greater than or equal to 2; and the first bit in the sub-header is an extended field, the second bit in the sub-header is the type indication field, and the third bit to the eighth bit in the sub-header are used to indicate a random access preamble identifier.

In one embodiment, the MAC header of the MAC PDU includes L first sub-headers, each first sub-header includes n type indication fields, and each type indication field corresponds to one MAC RAR in the MAC PDU, where n is a positive integer, and L is a positive integer greater than or equal to 1.

In one embodiment, the L first sub-headers are the last L sub-headers in the MAC header, and the L first sub-headers do not include the first sub-header in the MAC header; or the L first sub-headers are the first L sub-headers in the MAC header other than the first sub-header.

In one embodiment, each first sub-header includes eight bits, and the first bit in each first sub-header is an extended field, the second bit is a type field, and the type field is used to indicate that the third bit to the eighth bit in the first sub-header is configured as the type indication field.

If the type field of the sub-header is set to 0, each of the third bit to the eighth bit of the sub-header corresponds to one type indication field.

In one embodiment, the $x^{th}$ type indication field in the first sub-header corresponds to the $x^{th}$ MAC RAR in the MAC PDU, where x is a positive integer.

In one embodiment, when the type indication field is 1, the type indication field indicates that the terminal transmits the data in the first uplink information in a first manner, where the first manner is a first uplink grant; or when the type indication field is 0, the type indication field indicates that the terminal transmits the data in the first uplink information in a second manner, and the second manner is the second uplink grant; or when the type indication field is 1, the type indication field indicates that the terminal transmits the data in the first uplink information in a third manner, where the third manner is a third uplink grant; or when the type indication field is 0, the type indication field indicates that the terminal transmits the data in the first uplink information in a fourth manner, and the fourth manner is the fourth uplink grant; or when the type indication field is 1, the type indication field indicates that the terminal transmits the data in the first uplink information in a fifth manner, where the fifth manner is a second uplink grant; or when the type indication field is 0, the type indication field indicates that the terminal transmits the data in the first uplink information in a sixth manner, and the sixth manner is the fourth uplink grant, where the first uplink grant indicates that the terminal determines, in a first query manner, a transport block size for transmitting the first uplink information; the second uplink grant indicates that the terminal determines, in a second query manner, the transport block size for transmitting the first uplink information; the third uplink grant indicates that the terminal allocates a resource in a unit of a physical resource block, and the resource allocated by using the third uplink grant is greater than or equal to one physical resource block; and the resource allocated by using the fourth uplink grant is less than one physical resource block; and a maximum transport block size TBS determined in the first query manner is less than a maximum TBS determined in the second query manner.

In one embodiment, when the type indication field is 0, the type indication field indicates that the terminal transmits the data in the first uplink information in a seventh manner, where the seventh manner is a first uplink grant; or when the type indication field is 1, the type indication field indicates that the terminal transmits the data in the first uplink information in an eighth manner, and the eighth manner is the second uplink grant; or when the type indication field is 0, the type indication field indicates that the terminal transmits the data in the first uplink information in a ninth manner, where the ninth manner is a third uplink grant; or when the type indication field is 1, the type indication field indicates that the terminal transmits the data in the first uplink information in a tenth manner, and the tenth manner is the fourth uplink grant; or when the type indication field is 0, the type indication field indicates that the terminal transmits the data in the first uplink information in an eleventh manner, where the eleventh manner is a second uplink grant; or when the type indication field is 1, the type indication field indicates that the terminal transmits the data in the first uplink information in a twelfth manner, and the twelfth manner is a fourth uplink grant, where the first uplink grant indicates that the terminal determines, in a first query manner, a transport block size for transmitting the first uplink information; the second uplink grant indicates that the terminal determines, in a second query manner, the transport block size for transmitting the first uplink information; the third uplink grant indicates that the terminal allocates a resource in a unit of a physical resource block, and the resource allocated by using the third uplink grant is greater than or equal to one physical resource block; and the resource allocated by using the fourth uplink grant is less than one physical resource block; and a maximum transport block size TBS determined in the first query manner is less than a maximum TBS determined in the second query manner.

In one embodiment, when a physical random access channel of the terminal uses a first mode, the terminal transmits the data in the first uplink information in a thirteenth manner or a fourteenth manner, where the thirteenth manner is the first uplink grant, and the fourteenth manner is the second uplink grant; and/or when a physical random access channel of the terminal uses a second mode, the terminal transmits the data in the first uplink information in a fifteenth manner or a sixteenth manner, where the fifteenth manner is the third uplink grant, and the sixteenth manner is the fourth uplink grant, where the first mode is one or more of a coverage enhancement level 0, a coverage enhancement level 1, and a coverage enhancement mode A, and the second mode is one or more of a coverage enhancement level 2, a coverage enhancement level 3, and a coverage enhancement mode B.

In one embodiment, the first uplink information is uplink information associated with the MAC RAR in the MAC PDU; or the first uplink information is carried on a physical uplink shared channel, and the first uplink information is the first piece of uplink information after the MAC RAR; or the first uplink information is a message 3 in a random access procedure; or the first uplink information is uplink information between a message 3 in a random access procedure and a contention resolution message in a random access procedure; or the first uplink information is uplink information between a random access response message and a contention resolution message in a random access procedure.

The apparatus may be configured to perform the method provided in the corresponding method embodiment. Specific implementations and technical effects are similar, and details are not described herein again.

It should be noted that division of the foregoing units of the data transmission apparatus is merely division of logical functions. In actual implementation, all or some of the units may be integrated into one physical entity, or may be physically separated. In addition, these units may all be implemented in a form of software invoked by using a processing element, or may all be implemented in a form of hardware; or some units may be implemented in a form of software invoked by using a processing element, and some units may be implemented in a form of hardware. For example, the sending unit may be an independently disposed processing element, or may be integrated into a chip of the base station for implementation. In addition, the sending unit may be stored in a memory of the base station as a program, and a processing element of the base station invokes and executes a function of the sending unit. Implementation of other units is similar to this. In addition, all or some of these units may be integrated or may be separately implemented. The processing element may be an integrated circuit and has a signal processing capability. In an implementation process, operations in the foregoing methods or the foregoing units can be implemented by using a hardware integrated logical circuit in the processing element, or by using instructions in a form of software. In addition, the sending unit is a control sending unit, and may receive, by using a sending apparatus of the base station such as an antenna and a radio frequency apparatus, information sent by a terminal.

The foregoing units may be configured as one or more integrated circuits for implementing the foregoing method, for example, one or more application-specific integrated circuits (ASIC), one or more microprocessors (DSP), or one or more field programmable gate arrays (FPGA). For another example, when one of the units is implemented in a form of a program scheduled by the processing element, the processing element may be a general-purpose processor, for example, a central processing unit (CPU) or another processor that can invoke a program. For another example, these units may be integrated together and implemented in a form of a system-on-a-chip (SOC).

Figure 11:
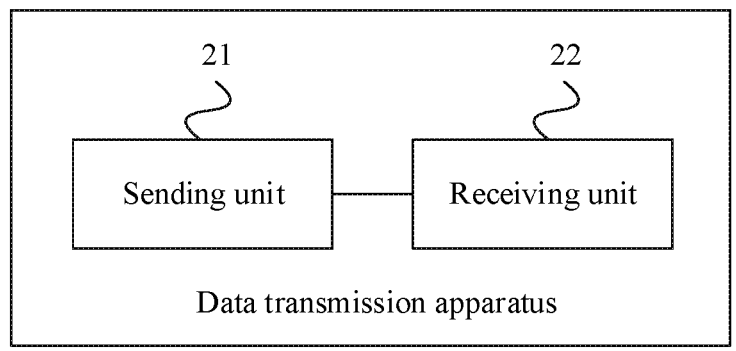
FIG. 11 is a schematic structural diagram of a data transmission apparatus in Embodiment 2 according to this application.

FIG. 11 is a schematic structural diagram of a data transmission apparatus in Embodiment 2 according to this application. The apparatus may be located in a terminal. Referring to FIG. 11, the apparatus includes a sending unit 21 and a receiving unit 22.

The sending unit 21 is configured to send a random access preamble sequence to a base station.

The receiving unit 22 is configured to receive a media access control MAC packet data unit PDU sent by the base station based on the random access preamble sequence, where the MAC PDU includes a type indication field, and the type indication field is used to indicate a manner in which the terminal transmits data in first uplink information.

In one embodiment, the type indication field is located in a MAC random access response RAR of the MAC PDU.

In one embodiment, the type indication field is located in a MAC header of the MAC PDU.

In one embodiment, the type indication field includes one bit, and the bit included in the type indication field is the first bit in the MAC RAR; or the bit included in the type indication field is at least one of the $1^{st}$, $28^{th}$, $29^{th}$, $30^{th}$, $31^{st}$, or $32^{nd}$ bit in the MAC RAR.

In one embodiment, one MAC RAR in the MAC PDU corresponds to one sub-header in the MAC header of the MAC PDU, the sub-header includes eight bits, the sub-header is the $m^{th}$ sub-header in the MAC header, and m is a positive integer greater than or equal to 2; and the first bit in the sub-header is an extended field, the second bit in the sub-header is the type indication field, and the third bit to the eighth bit in the sub-header are used to indicate a random access preamble identifier.

In one embodiment, the MAC header of the MAC PDU includes L first sub-headers, each first sub-header includes n type indication fields, and each type indication field corresponds to one MAC RAR in the MAC PDU, where n is a positive integer, and L is a positive integer greater than or equal to 1.

In one embodiment, the L first sub-headers are the last L sub-headers in the MAC header, and the L first sub-headers do not include the first sub-header in the MAC header; or the L first sub-headers are the first L sub-headers in the MAC header other than the first sub-header.

In one embodiment, each first sub-header includes eight bits, and the first bit in each first sub-header is an extended field, the second bit is a type field, the type field is used to indicate that the third bit to the eighth bit in the first sub-header are configured as the type indication field.

If the type field of the sub-header is set to 0, each of the third bit to the eighth bit in the sub-header corresponds to one type indication field.

In one embodiment, the $x^{th}$ type indication field in the first sub-header corresponds to the $x^{th}$ MAC RAR in the MAC PDU, where x is a positive integer.

In one embodiment, when the type indication field is 1, the type indication field indicates that the terminal transmits the data in the first uplink information in a first manner, where the first manner is a first uplink grant, or when the type indication field is 0, the type indication field indicates that the terminal transmits the data in the first uplink information in a second manner, and the second manner is the second uplink grant; or when the type indication field is 1, the type indication field indicates that the terminal transmits the data in the first uplink information in a third manner, where the third manner is a third uplink grant; or when the type indication field is 0, the type indication field indicates that the terminal transmits the data in the first uplink information in a fourth manner, and the fourth manner is the fourth uplink grant; or when the type indication field is 1, the type indication field indicates that the terminal transmits the data in the first uplink information in a fifth manner, where the fifth manner is a second uplink grant; or when the type indication field is 0, the type indication field indicates that the terminal transmits the data in the first uplink information in a sixth manner, and the sixth manner is the fourth uplink grant, where the first uplink grant indicates that the terminal determines, in a first query manner, a transport block size for transmitting the first uplink information; the second uplink grant indicates that the terminal determines, in a second query manner, the transport block size for transmitting the first uplink information; the third uplink grant indicates that the terminal allocates a resource in a unit of a physical resource block, and the resource allocated by using the third uplink grant is greater than or equal to one physical resource block; and the resource allocated by using the fourth uplink grant is less than one physical resource block; and a maximum transport block size TBS determined in the first query manner is less than a maximum TBS determined in the second query manner.

In one embodiment, when the type indication field is 0, the type indication field indicates that the terminal transmits the data in the first uplink information in a seventh manner, where the seventh manner is a first uplink grant; or when the type indication field is 1, the type indication field indicates that the terminal transmits the data in the first uplink information in an eighth manner, and the eighth manner is the second uplink grant; or when the type indication field is 0, the type indication field indicates that the terminal transmits the data in the first uplink information in a ninth manner, where the ninth manner is a third uplink grant; or when the type indication field is 1, the type indication field indicates that the terminal transmits the data in the first uplink information in a tenth manner, and the tenth manner is the fourth uplink grant; or when the type indication field is 0, the type indication field indicates that the terminal transmits the data in the first uplink information in an eleventh manner, where the eleventh manner is a second uplink grant; or when the type indication field is 1, the type indication field indicates that the terminal transmits the data in the first uplink information in a twelfth manner, and the twelfth manner is a fourth uplink grant, where the first uplink grant indicates that the terminal determines, in a first query manner, a transport block size for transmitting the first uplink information; the second uplink grant indicates that the terminal determines, in a second query manner, the transport block size for transmitting the first uplink information; the third uplink grant indicates that the terminal allocates a resource in a unit of a physical resource block, and the resource allocated by using the third uplink grant is greater than or equal to one physical resource block; and the resource allocated by using the fourth uplink grant is less than one physical resource block; and a maximum transport block size TBS determined in the first query manner is less than a maximum TBS determined in the second query manner.

In one embodiment, when a physical random access channel of the terminal uses a first mode, the terminal transmits the data in the first uplink information in a thirteenth manner or a fourteenth manner, where the thirteenth manner is the first uplink grant, and the fourteenth manner is the second uplink grant; and/or when a physical random access channel of the terminal uses a second mode, the terminal transmits the data in the first uplink information in a fifteenth manner or a sixteenth manner, where the fifteenth manner is the third uplink grant, and the sixteenth manner is the fourth uplink grant, where the first mode is one or more of a coverage enhancement level 0, a coverage enhancement level 1, and a coverage enhancement mode A, and the second mode is one or more of a coverage enhancement level 2, a coverage enhancement level 3, and a coverage enhancement mode B.

In one embodiment, the first uplink information is uplink information associated with the MAC RAR in the MAC PDU; or the first uplink information is carried on a physical uplink shared channel, and the first uplink information is the first piece of uplink information after the MAC RAR; or the first uplink information is a message 3 in a random access procedure;

the first uplink information is uplink information between a message 3 in a random access procedure and a contention resolution message in a random access procedure; or the first uplink information is uplink information between a random access response message and a contention resolution message in a random access procedure.

The apparatus may be configured to perform the method provided in the corresponding method embodiment. Specific implementations and technical effects are similar, and details are not described herein again.

It should be noted that division of the foregoing units of the data transmission apparatus is merely division of logical functions. In actual implementation, all or some of the units may be integrated into one physical entity, or may be physically separated. In addition, these units may all be implemented in a form of software invoked by using a processing element, or may all be implemented in a form of hardware; or some units may be implemented in a form of software invoked by using a processing element, and some units may be implemented in a form of hardware. For example, the sending unit may be an independently disposed processing element, or may be integrated into a chip of the terminal for implementation. In addition, the sending unit may be stored in a memory of the terminal as a program, and a processing element of the terminal invokes and executes a function of the sending unit. Implementation of other units is similar to this. In addition, all or some of these units may be integrated or may be separately implemented. The processing element may be an integrated circuit and has a signal processing capability. In an implementation process, operations in the foregoing methods or the foregoing units can be implemented by using a hardware integrated logical circuit in the processing element, or by using instructions in a form of software. In addition, the sending unit is a control sending unit, and may receive, by using a sending apparatus of the terminal such as an antenna and a radio frequency apparatus, information sent by a base station.

The foregoing units may be configured as one or more integrated circuits for implementing the foregoing method, for example, one or more application-specific integrated circuits (Application Specific Integrated Circuit, ASIC), one or more microprocessors (digital signal processor, DSP), or one or more field programmable gate arrays (Field Programmable Gate Array, FPGA). For another example, when one of the units is implemented in a form of a program scheduled by the processing element, the processing element may be a general-purpose processor, for example, a central processing unit (Central Processing Unit, CPU) or another processor that can invoke a program. For another example, these units may be integrated together and implemented in a form of a system-on-a-chip (system-on-a-chip, SOC).

Figure 12:
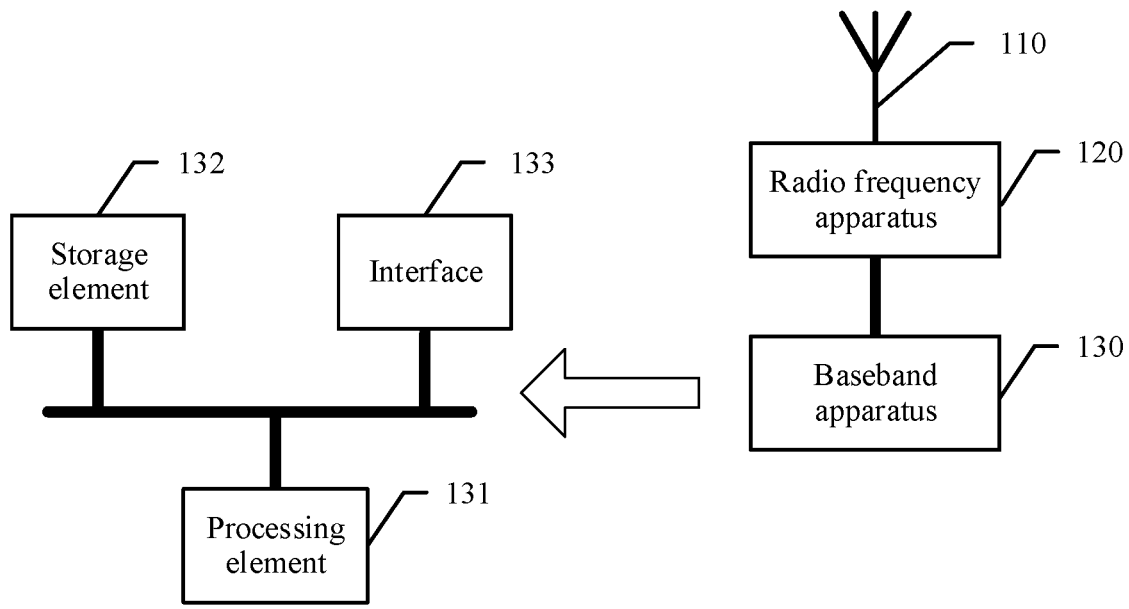
FIG. 12 is a schematic structural diagram of a base station according to an embodiment of this application.

FIG. 12 is a schematic structural diagram of a base station according to an embodiment of this application. Referring to FIG. 12, the base station includes an antenna 110, a radio frequency apparatus 120, and a baseband apparatus 130. The antenna 110 is connected to the radio frequency apparatus 120. In an uplink direction, the radio frequency apparatus 120 receives, by using the antenna 110, information sent by a terminal, and sends, to the baseband apparatus 130 for processing, the information sent by the terminal. In a downlink direction, the baseband apparatus 130 processes the information of the terminal, and sends the information to the radio frequency apparatus 120. The radio frequency apparatus 120 processes the information of the terminal, and sends the information to the terminal by using the antenna 110.

The foregoing data transmission apparatus may be located in the baseband apparatus 130, and in an implementation, units are implemented in a form of a processing element scheduling a program. For example, the baseband apparatus 130 includes a processing element 131 and a storage element 132, and the processing element 131 invokes a program stored in the storage element 132, to perform the method in the foregoing method embodiment. In addition, the baseband apparatus 130 may further include an interface 133, configured to exchange information with the radio frequency apparatus 120. The interface is, for example, a common public radio interface (common public radio interface, CPRI).

In another implementation, the foregoing units may be configured as one or more processing elements for implementing the foregoing method. These processing elements are disposed on the baseband apparatus 130. The processing element herein may be an integrated circuit, for example, one or more ASICs, one or more DSPs, or one or more FPGAs. The integrated circuits may be integrated to form a chip.

For example, the foregoing units may be integrated in a form of a system-on-a-chip (system-on-a-chip, SOC). For example, the baseband apparatus 130 includes an SOC chip, and the chip is configured to implement the foregoing method. The processing element 131 and the storage element 132 may be integrated into the chip, and the processing element 131 invokes the program stored in the storage element 132, to implement the foregoing method or functions of the foregoing units. Alternatively, at least one integrated circuit may be integrated in the chip to implement the foregoing method or functions of the foregoing units. Alternatively, the foregoing implementations may be combined, functions of some units are implemented by a processing element invoking a program, and functions of some units are implemented by using an integrated circuit.

Regardless of a manner, the data transmission apparatus includes at least one processing element, a storage element, and a communications interface, and the at least one processing element is configured to perform the method provided in the foregoing method embodiment. The processing element may perform some or all of the operations in the foregoing method embodiment in a first manner of executing the program stored in the storage element, or in a second manner of using an integrated logic circuit of hardware in the processor element. Certainly, the method provided in the foregoing method embodiment may alternatively be performed by combining the first manner with the second manner.

Same as that in the foregoing description, the processing element herein may be a general purpose processor, for example, a central processing unit (CPU), or may be configured as one or more integrated circuits that perform the foregoing methods, for example, one or more application-specific integrated circuits (ASIC), one or more microprocessors (DSP), or one or more field programmable gate arrays (FPGA), or the like.

The storage element may be a memory, or may be a general name for a plurality of storage elements.

Figure 13:
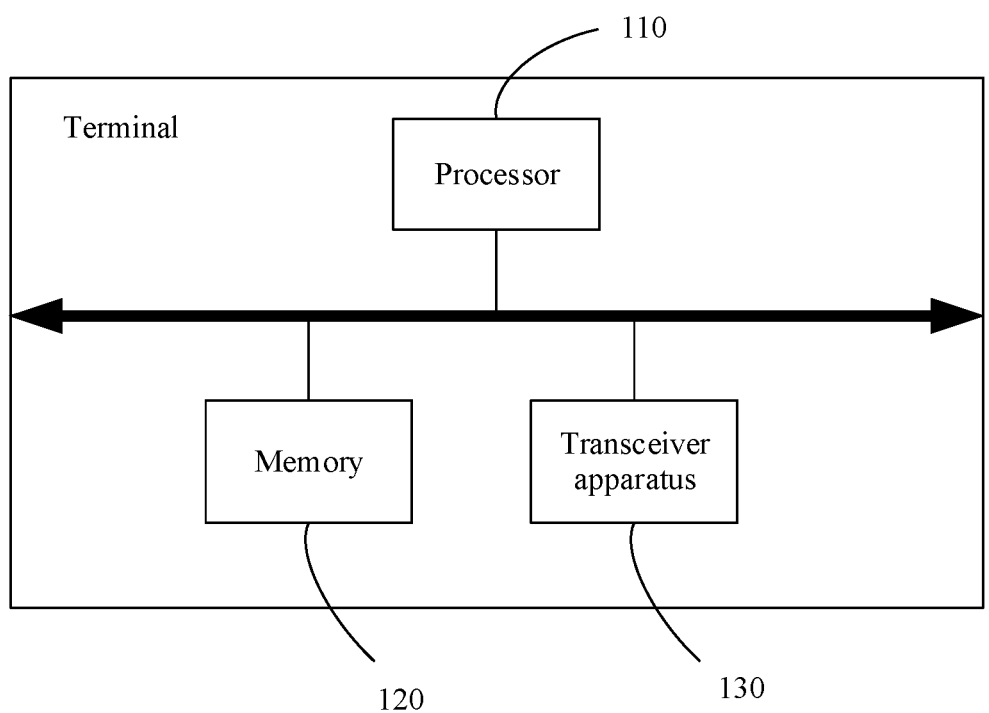
FIG. 13 is a schematic structural diagram of a terminal according to an embodiment of this application.

FIG. 13 is a schematic structural diagram of a terminal according to an embodiment of this application. Referring to FIG. 13, the terminal includes a processor 110, a memory 120, and a transceiver apparatus 130. The transceiver apparatus 130 may be connected to an antenna. In a downlink direction, the transceiver apparatus 130 receives, by using the antenna, information sent by a base station, and sends the information to the processor 110 for processing. In an uplink direction, the processor 110 processes data of the terminal, and sends the data to the base station by using the transceiver apparatus 130.

The memory 120 is configured to store a program for implementing the foregoing method embodiment or the units in the embodiment shown in FIG. 11, and the processor 110 invokes the program to perform operations in the foregoing method embodiment, to implement the units shown in FIG. 11.

Alternatively, some or all of the foregoing units may be implemented by using an integrated circuit that is embedded in a chip of the terminal. In addition, the units may be independently implemented, or may be integrated together. In other words, the foregoing units may be configured as one or more integrated circuits for implementing the foregoing method, for example, one or more application-specific integrated circuits (ASIC), one or more microprocessors (DSP), or one or more field programmable gate arrays (FPGA).

This application further provides a storage medium, including a readable storage medium and a computer program, and the computer program is used to implement the data transmission method provided in any one of the foregoing embodiments.

This application further provides a program product. The program product includes a computer program (namely, an execution instruction), and the computer program is stored in a readable storage medium. At least one processor of a sending device may read the computer program from the readable storage medium, and the at least one processor executes the computer program, so that the sending device performs the data transmission method provided in the foregoing implementations.

An embodiment of this application further provides a communications apparatus, including at least one storage element and at least one processing element. The at least one storage element is configured to store a program, and when the program is executed, the data transmission apparatus is enabled to perform an operation of the base station in any one of the foregoing embodiments. The apparatus may be a base station chip.

All or some operations of the foregoing method embodiments may be implemented by using hardware related to a program instruction. The foregoing program may be stored in a computer-readable memory. When the program is executed, the operations of the methods in the embodiments are performed. The memory (storage medium) includes: a read-only memory (ROM), a RAM, a flash memory, a hard disk, a solid state disk, a magnetic tape, a floppy disk, an optical disc, and any combination thereof.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A data transmission method, comprising:
   receiving, by a base station, a random access preamble sequence from a terminal;
   sending, by the base station, a media access control (MAC) packet data unit (PDU) to the terminal based on the random access preamble sequence, wherein the MAC PDU comprises a type indication field, and wherein the type indication field indicates a manner in which the terminal transmits data in first uplink information, wherein the type indication field is located in an MAC random access response (RAR) of the MAC PDU, and
   wherein the type indication field comprises one bit, and wherein the one bit comprised in the type indication field is a first bit in the MAC RAR, or the one bit comprised in the type indication field is at least one of a $1^{st}$, $28^{th}$, $29^{th}$, $30^{th}$, or $32^{nd}$ bit in the MAC RAR.

2. The method according to claim 1, wherein
   the first uplink information is uplink information associated with the MAC RAR in the MAC PDU; or
   the first uplink information is carried on a physical uplink shared channel, and the first uplink information is a first piece of uplink information after the MAC RAR; or
   the first uplink information is a message 3 in a random access procedure; or
   the first uplink information is uplink information between the message 3 in the random access procedure and a contention resolution message in the random access procedure; or
   the first uplink information is uplink information between a random access response message and the contention resolution message in the random access procedure.

3. A data transmission method, comprising:
   sending, by a terminal, a random access preamble sequence to a base station; and
   receiving, by the terminal, a media access control MAC packet data unit (PDU) from the base station based on the random access preamble sequence, wherein
   the MAC PDU comprises a type indication field, and wherein the type indication field indicates a manner in which the terminal transmits data in first uplink information, wherein the type indication field is located in an MAC random access response (RAR) of the MAC PDU, and
   wherein the type indication field comprises one bit, and wherein the one bit comprised in the type indication field is a first bit in the MAC RAR, or the one bit comprised in the type indication field is at least one of a $1^{st}$, $28^{th}$, $29^{th}$, $30^{th}$, or $32^{nd}$ bit in the MAC RAR.

4. The method according to claim 3, wherein
   the first uplink information is uplink information associated with the MAC RAR in the MAC PDU; or
   the first uplink information is carried on a physical uplink shared channel, and the first uplink information is a first piece of uplink information after the MAC RAR; or
   the first uplink information is a message 3 in a random access procedure; or
   the first uplink information is uplink information between the message 3 in the random access procedure and a contention resolution message in the random access procedure; or
   the first uplink information is uplink information between a random access response message and the contention resolution message in the random access procedure.

5. An apparatus, comprising: one or more processors, and a non-transitory storage medium configured to store program instructions; wherein, when executed by the one or more processors, the instructions cause the apparatus to perform a method that comprises:
   receiving a random access preamble sequence from a terminal;
   sending a media access control (MAC) packet data unit (PDU) to the terminal based on the random access preamble sequence, wherein the MAC PDU comprises a type indication field, and the type indication field indicates a manner in which the terminal transmits data in first uplink information, wherein the type indication field is located in an MAC random access response (RAR) of the MAC PDU, and wherein the type indication field comprises one bit, and wherein the one bit comprised in the type indication field is a first bit in the MAC RAR, or the one bit comprised in the type indication field is at least one of a $1^{st}$, $28^{th}$, $29^{th}$, $30^{th}$, or $32^{nd}$ bit in the MAC RAR.

6. The apparatus according to claim 5, wherein the first uplink information is uplink information associated with the MAC RAR in the MAC PDU; or the first uplink information is carried on a physical uplink shared channel, and the first uplink information is a first piece of uplink information after the MAC RAR; or the first uplink information is a message 3 in a random access procedure; or the first uplink information is uplink information between the message 3 in the random access procedure and a contention resolution message in the random access procedure; or the first uplink information is uplink information between a random access response message and the contention resolution message in the random access procedure.

7. An apparatus, comprising: one or more processors, and a non-transitory storage medium configured to store program instructions; wherein, when executed by the one or more processors, the instructions cause the apparatus to perform a method that comprises:

sending a random access preamble sequence to a base station; and receiving a media access control MAC packet data unit (PDU) from the base station based on the random access preamble sequence, wherein the MAC PDU comprises a type indication field, and the type indication field indicates a manner in which the terminal transmits data in first uplink information, wherein the type indication field is located in an MAC random access response (RAR) of the MAC PDU, and wherein the type indication field comprises one bit, and wherein the one bit comprised in the type indication field is a first bit in the MAC RAR, or the one bit comprised in the type indication field is at least one of a $1^{st}$, $28^{th}$, $29^{th}$, $30^{th}$, or $32^{nd}$ bit in the MAC RAR.

8. The apparatus according to claim 7, wherein the first uplink information is uplink information associated with the MAC RAR in the MAC PDU; or the first uplink information is carried on a physical uplink shared channel, and the first uplink information is a first piece of uplink information after the MAC RAR; or the first uplink information is a message 3 in a random access procedure; or the first uplink information is uplink information between the message 3 in the random access procedure and a contention resolution message in the random access procedure; or the first uplink information is uplink information between a random access response message and the contention resolution message in the random access procedure.

* * * * *